(12) United States Patent
Kini et al.

(10) Patent No.: US 11,848,783 B2
(45) Date of Patent: Dec. 19, 2023

(54) METHOD AND APPARATUS FOR IMPROVING HYBRID AUTOMATIC REPEAT REQUEST (HARQ) FEEDBACK PERFORMANCE OF ENHANCED MOBILE BROADBAND (EMBB) WHEN IMPACTED BY LOW LATENCY TRAFFIC

(71) Applicant: InterDigital Patent Holdings, Inc., Wilmington, DE (US)

(72) Inventors: Ananth Kini, East Norriton, PA (US); Seyed Mohsen Hosseinian, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/841,395

(22) Filed: Jun. 15, 2022

(65) Prior Publication Data

US 2022/0311552 A1 Sep. 29, 2022

Related U.S. Application Data

(63) Continuation of application No. 16/609,936, filed as application No. PCT/US2018/030639 on May 2, 2018, now Pat. No. 11,394,494.

(Continued)

(51) Int. Cl.
*H04L 1/1812* (2023.01)
*H04L 1/1829* (2023.01)
(Continued)

(52) U.S. Cl.
CPC .......... *H04L 1/1812* (2013.01); *H04L 1/1861* (2013.01); *H04L 1/1864* (2013.01);
(Continued)

(58) Field of Classification Search
None
See application file for complete search history.

(56) References Cited

U.S. PATENT DOCUMENTS

| 8,514,883 B2 | 8/2013 | Pan et al. |
| 8,731,088 B2 | 5/2014 | Ko et al. |

(Continued)

FOREIGN PATENT DOCUMENTS

| CN | 101667900 A | 3/2010 |
| CN | 108631950 A | 10/2018 |

(Continued)

OTHER PUBLICATIONS

Author Unknown, Discussion on CB group based HARQ operation, Doc No. R1-1704916, pp. 1-4, Apr. 7, 2017.*

(Continued)

*Primary Examiner* — Christopher M Crutchfield
(74) *Attorney, Agent, or Firm* — Flaster Greenberg, P.C.

(57) ABSTRACT

Methods and apparatuses are described herein for providing a single-bit hybrid automatic repeat request (HARQ) feedback and a multi-bit HARQ feedback in a wireless transmit/receive unit (WTRU). For example, a WTRU may receive, via a physical downlink control channel (PDCCH), downlink control information (DCI). The DCI may include a field that indicates a code block group (CBG) based retransmission for at least one transport block (TB). On a condition that the DCI does not include the field, the WTRU may transmit, via a physical uplink control channel (PUCCH), a single-bit HARQ feedback for a TB-based retransmission. On a condition that the DCI includes the field, the WTRU may transmit, via the PUCCH, the multi-bit HARQ feedback for the CBG-based retransmission. The WTRU may be configured to provide the single-bit HARQ feedback for the (Continued)

TB-based retransmission and a multi-bit HARQ feedback for the CBG-based retransmission.

20 Claims, 14 Drawing Sheets

Related U.S. Application Data

(60) Provisional application No. 62/615,744, filed on Jan. 10, 2018, provisional application No. 62/543,047, filed on Aug. 9, 2017, provisional application No. 62/519,372, filed on Jun. 14, 2017, provisional application No. 62/500,938, filed on May 3, 2017.

(51) Int. Cl.
  *H04L 5/00* (2006.01)
  *H04W 72/23* (2023.01)
  *H04L 43/0823* (2022.01)
  *H04L 43/06* (2022.01)

(52) U.S. Cl.
  CPC ............ *H04L 5/0055* (2013.01); *H04L 43/06* (2013.01); *H04L 43/0823* (2013.01); *H04W 72/23* (2023.01)

(56) References Cited

U.S. PATENT DOCUMENTS

| | | | |
|---|---|---|---|
| 9,521,665 | B2 | 12/2016 | Park et al. |
| 9,756,625 | B2 | 9/2017 | Liu et al. |
| 11,050,518 | B2* | 6/2021 | Park ................ H04L 1/1854 |
| 2011/0004799 | A1 | 1/2011 | Shimanuki et al. |
| 2012/0176947 | A1 | 7/2012 | Xi et al. |
| 2015/0189629 | A1 | 7/2015 | Seo et al. |
| 2016/0192388 | A1 | 6/2016 | Ekpenyong et al. |
| 2018/0167932 | A1* | 6/2018 | Papasakellariou .... H04L 1/1812 |
| 2018/0247745 | A1* | 8/2018 | Yoshidome ......... H01F 1/15308 |
| 2018/0270022 | A1* | 9/2018 | Sun ....................... H04L 1/1887 |
| 2018/0351706 | A1 | 12/2018 | Park et al. |
| 2019/0007959 | A1 | 1/2019 | Hwang et al. |
| 2019/0103943 | A1 | 4/2019 | Wang et al. |
| 2019/0149271 | A1 | 5/2019 | Yin et al. |
| 2019/0174440 | A1* | 6/2019 | Kwak ................. H04L 25/0202 |
| 2019/0335435 | A1 | 10/2019 | Gou et al. |
| 2020/0021401 | A1 | 1/2020 | Guan |

FOREIGN PATENT DOCUMENTS

| | | |
|---|---|---|
| EP | 2166689 A1 | 3/2010 |
| EP | 2413627 A1 | 2/2012 |
| RU | 2504076 C2 | 1/2014 |
| WO | WO 2015/179136 A1 | 11/2015 |
| WO | WO 2017/014558 A1 | 1/2017 |

OTHER PUBLICATIONS

Author Unknown, On pre-emption indication for DL multiplexing of URLLC and eMBB, Doc No. R1-1704215 pp. 1-5, Apr. 7, 2017.*
Author Unknown, DL indication channel design principle for URLLC/eMBB dynamic multiplexing, Doc No. R1-1705623 pp. 1-10, Apr. 7, 2017.*
Author Unknown, Discussion on NR HARQ-ACK feedback mechanisms, Doc. No. R1-1704583, pp. 1-4, Apr. 7, 2017.*
InterDigital Communications, "Multi-bit HARQ feedback," 3GPP TSG RAN WG1 AH NR Meeting, R1-1700706, Spokane, USA (Jan. 16-20, 2017).
Nakagawa et al, "Multicast Transmission Method based on Selective Retransmission with Network Coding in Nireless LANs," The Institute of Electronics, information and Communication Engineers, IEICE Technical Report, vol. 111, No. 468, pp. 319-322 {Mar. 1, 2012).
Author Unknown, Overview of CBG-based retransmission in NR, Doc. No. R1-1705401, Apr. 7, 2017, pp. 1-4 (Year: 2017).
Author Unknown, Discussion on CB group based HARO-ACK feedback, Apr. 7, 2017, pp. 1-4 (Year: 2017).
Author Unknown, Discussion on CBG-based feedback and retransmission, Apr. 7, 2017, pp. 1-4 (Year: 2017).
Samsung, "CB-group based retransmission for eMBB," 3GPP TSG RAN WG1 Meeting #88, R1-1702990, Athens, 3reece {Feb. 13-17, 2017).
Ericsson, "Remaining Issues for CBG Based Transmissions and Retransmissions," 3GPP TSG RAN WG1 Meeting 91, R1-1721014, Reno, USA (Nov. 27-Dec. 1, 2017).
Huawei et al., "Discussion on CBG-based feedback and retransmission," 3GPP TSG RAN WG1 Meeting #88bis, R1-1705066, Spokane, USA (Apr. 3-7, 2017).
Huawei et al., "Discussion on CBG-based feedback," 3GPP TSG RAN WG1 Meeting #89, R1-1706964, Hangzhou, China (May 15-19, 2017).
Huawei et al., "Discussion on CBG-based feedback," 3GPP TSG RAN WG1 NR Ad Hoc Meeting, R1-1709969, Qingdao, China (Jun. 27-30, 2017).
Huawei et al., "Multiplexing of multiple HARO-ACK feedback," 3GPP TSG RAN WG1 Meeting #89, R1-1708151, Hangzhou, China (May 15-19, 2017).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).
InterDigital Inc., "CBG-based (re)-transmission," 3GPP TSG RAN WG1 Meeting NR#3, R1-1716257, Nagoya, Japan (Sep. 18-21, 2017).
InterDigital Inc., "CBG-based (re)-transmission," 3GPP TSG RAN WG1 Meeting 90bis, R1-1718363, Prague, CZ (Oct. 9-13, 2017).
InterDigital Inc., "HARO feedback design aspects for CBG based transmission," 3GPP TSG RAN WG1 Meeting #90, R1-1714161, Prague, Czech Republic (Aug. 21-25, 2017).
InterDigital Inc., "HARO feedback design considerations for CBG based transmission," 3GPP TSG RAN WG1 NR Ad-Hoc#2, R1-1710954, Qingdao, P.R. China (Jun. 27-30, 2017).
InterDigital Inc., "HARO feedback design improvements when considering impact of low latency traffic," 3GPP TSG RAN WG1 Meeting #89, R1-1708354, Hangzhou, P.R. China (May 15-19, 2017).
LG Electronics, "Discussion on CB group based HARO operation," 3GPP TSG RAN WG1 Meeting #88bis, R1-1704916, Spokane, USA (Apr. 3-7, 2017).

(56) References Cited

OTHER PUBLICATIONS

Samsung, "Overview of CBG-based retransmission in NR," 3GPP TSG RAN WG1 Meeting #88bis, R1-1705401, Spokane, USA (Apr. 3-7, 2017).
Third Generation Partnership Project, "Technical Specification Group Radio Access Network; Evolved Universal Terrestrial Radio Access (E-UTRA); Physical layer procedures (Release 14)," 3GPP TS 36.213 V14.2.0 (Mar. 2017).
Third Generation Partnership Project, "Technical Specification Group Radio Access Network; Evolved Universal Terrestrial Radio Access (E-UTRA); Physical layer procedures (Release 14)," 3GPP TS 36.213 V14.6.0 (Mar. 2018).
Third Generation Partnership Project, "Technical Specification Group Radio Access Network; Evolved Universal Terrestrial Radio Access (E-UTRA); Physical layer procedures (Release 15)," 3GPP TS 36.213 V15.1.0 (Mar. 2018).
Third Generation Partnership Project, "Technical Specification Group Radio Access Network; Evolved Universal Terrestrial Radio Access (E-UTRA); Multiplexing and channel coding (Release 14)," 3GPP TS 36.212 V14.2.0 (Mar. 2017).
Third Generation Partnership Project, "Technical Specification Group Radio Access Network; Evolved Universal Terrestrial Radio Access (E-UTRA); Multiplexing and channel coding (Release 14)," 3GPP TS 36.212 V14.5.1 (Jan. 2018).
Third Generation Partnership Project, "Technical Specification Group Radio Access Network; Evolved Universal Terrestrial Radio Access (E-UTRA); Multiplexing and channel coding (Release 15)," 3GPP TS 36.212 V15.1.0 (Mar. 2018).
Third Generation Partnership Project, "Technical Specification Group Radio Access Network; NR; Physical layer procedures for control (Release 15)," 3GPP TS 38.213 V15.0.1 (Mar. 2018).
Third Generation Partnership Project, "Technical Specification Group Radio Access Network; NR; Physical layer procedures for control (Release 15)," 3GPP TS 38.213 V15.1.0 (Mar. 2018).
Third Generation Partnership Project, "Technical Specification Group Radio Access Network; NR; Multiplexing and channel coding (Release 15)," 3GPP TS 38.212 V15.1.1 (Apr. 2018).

* cited by examiner

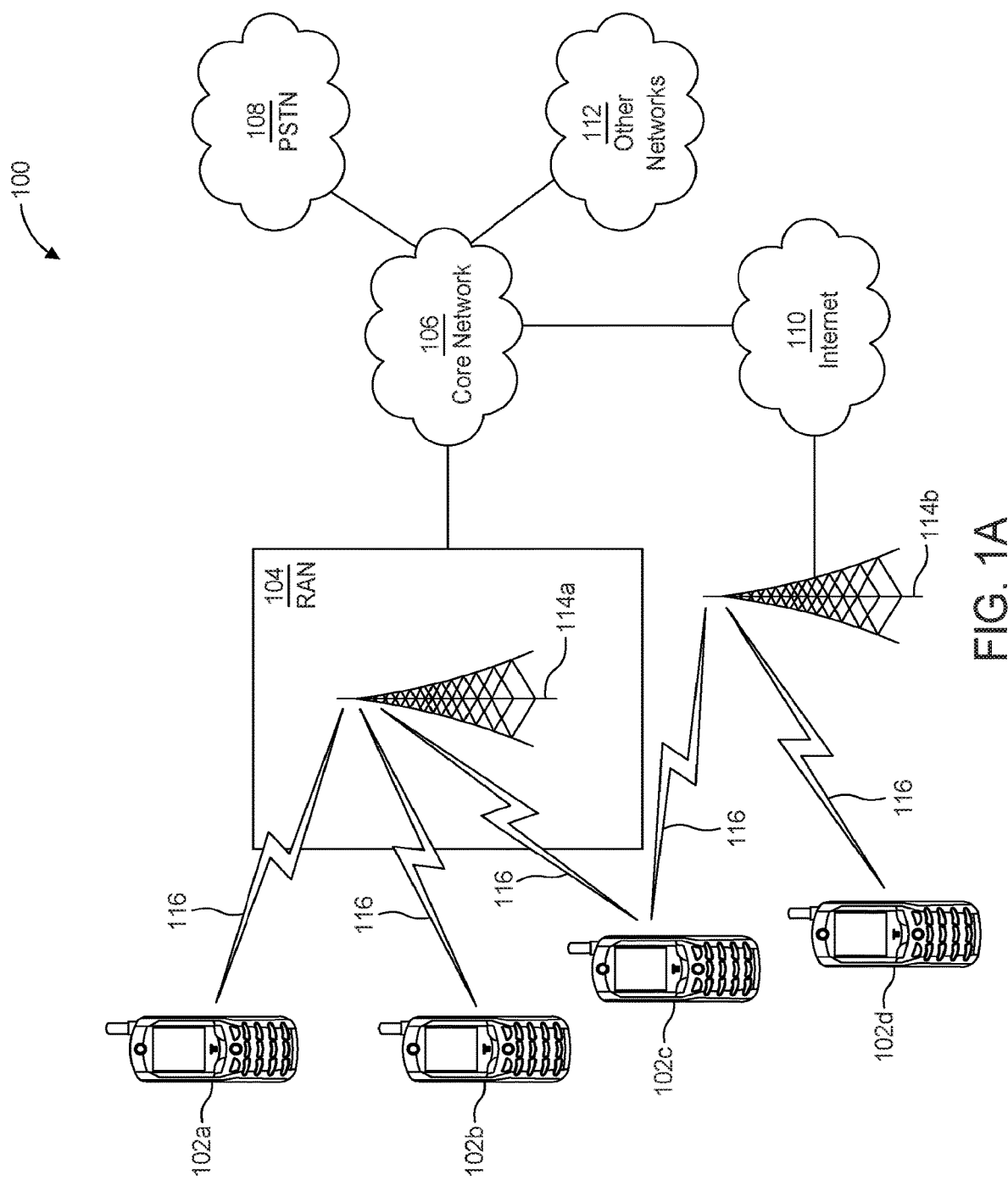

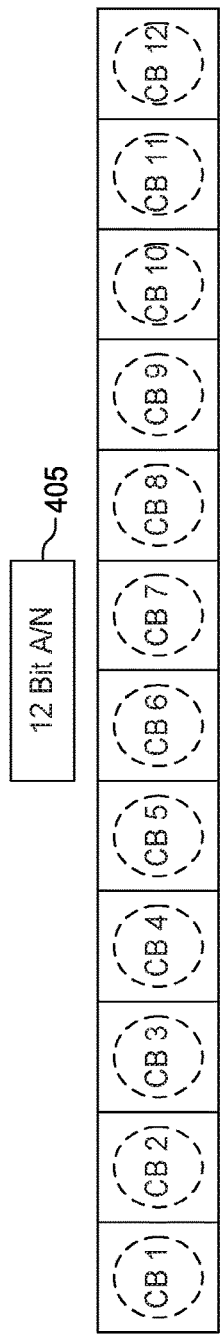
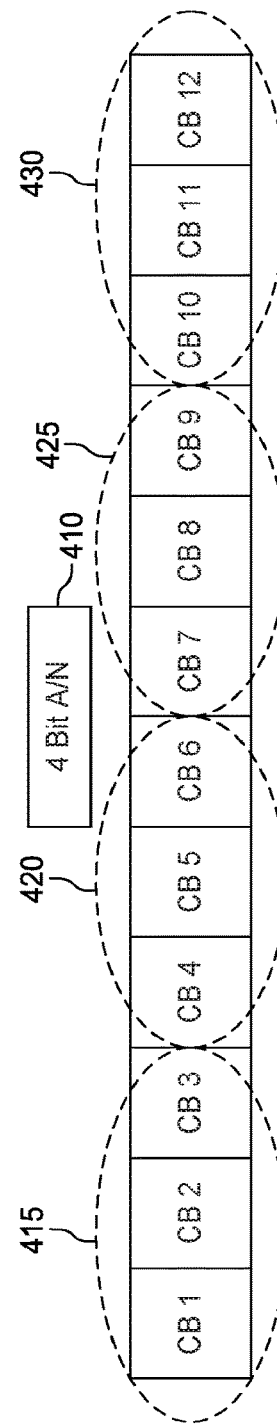
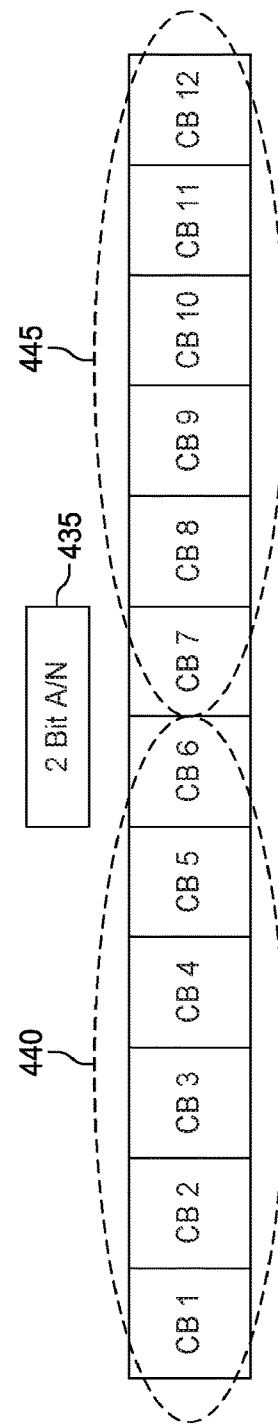
FIG. 4A
FIG. 4B
FIG. 4C

METHOD AND APPARATUS FOR IMPROVING HYBRID AUTOMATIC REPEAT REQUEST (HARQ) FEEDBACK PERFORMANCE OF ENHANCED MOBILE BROADBAND (EMBB) WHEN IMPACTED BY LOW LATENCY TRAFFIC

CROSS REFERENCE TO RELATED APPLICATIONS

This application is a continuation of U.S. Non-Provisional patent application Ser. No. 16/609,936, filed Oct. 31, 2019, which is the U.S. National Stage, under 35 U.S.C. § 371, of International Application No. PCT/US2018/030639 filed May 2, 2018, which claims the benefit of U.S. Provisional Application No. 62/615,744, filed Jan. 10, 2018, U.S. Provisional Application No. 62/543,047, filed Aug. 9, 2017, U.S. Provisional Application No. 62/519,372, filed Jun. 14, 2017 and U.S. Provisional Application No. 62/500,938, filed on May 3, 2017, the contents of which are hereby incorporated by reference herein.

BACKGROUND

Hybrid automatic repeat request (HARQ) is a combination of a soft combining error correction and ARQ error control. With the soft combining error correction technique, data packets that were not properly decoded are not discarded anymore. Instead, the received data is stored in a buffer and will be combined with next retransmission. Receivers detecting a corrupted message will request a new message (i.e. retransmission) from the sender by transmitting feedback messages. These feedback messages are transmitted from the receiver to the sender respectively to inform a good (i.e. positive acknowledgement) or bad (i.e. negative acknowledgement) reception of the previous transmission. In Long Term Evolution (LTE), these retransmissions are based on a transport block (TB) which is the data from the upper layer given to the physical layer. If a received TB is not properly decoded (i.e. corrupted), a wireless transmit/receive unit (WTRU) may transmits a negative acknowledgment (NACK), thereby requesting the base station (BS) to retransmit the entire TB. In New Radio (NR) where a BS needs to serve ultra-reliable low latency (URLLC) traffic first in the presence of enhanced mobile broadband (eMBB) traffic, transmitting the entire TB again due to the small portion of error detected in the TB would be very inefficient. Thus, it would be desirable to have more flexible retransmission schemes that provide feedback messages based on a code block (CB), a code block group (CBG), or a transport block (TB) depending on the network/device configuration.

SUMMARY

Methods and apparatuses are described herein for providing a single-bit hybrid automatic repeat request (HARQ) feedback and a multi-bit HARQ feedback in a wireless transmit/receive unit (WTRU). For example, a WTRU may receive, via a physical downlink control channel (PDCCH), downlink control information (DCI). The DCI may include a field that indicates a code block group (CBG) based retransmission for at least one transport block (TB). On a condition that the DCI does not include the field indicating a CBG-based retransmission for at least one transport block (TB), the WTRU may transmit, via a physical uplink control channel (PUCCH), a single-bit HARQ feedback for a TB-based retransmission. On a condition that the DCI includes the field indicating the CBG-based retransmission for the at least one TB, the WTRU may transmit, via the PUCCH, the multi bit HARQ feedback for the CBG-based retransmission. The multi-bit HARQ feedback may include a plurality of bits indicating whether at least one CBG in the at least one TB is requested for retransmission or not. Each of the plurality of bits maps to each of the at least one CBG in the at least one TB, respectively. The multi-bit HARQ feedback may also be semi-statically configured with a maximum number of CBGs based on a higher layer parameter. The WTRU may be configured to provide the single-bit HARQ feedback for the TB-based retransmission and a multi-bit HARQ feedback for the CBG-based retransmission.

BRIEF DESCRIPTION OF THE DRAWINGS

A more detailed understanding may be had from the following description, given by way of example in conjunction with the accompanying drawings wherein:

FIG. 1A is a system diagram illustrating an example communications system in which one or more disclosed embodiments may be implemented;

FIG. 4A a diagram illustrating an example multi-bit hybrid automatic repeat request (HARQ) feedback, where the multi-bit HARQ feedback allows for CB level granularity for retransmissions;

FIG. 4B a diagram illustrating an example multi-bit HARQ feedback, where the multi-bit HARQ feedback allows for code block group (CBG) level granularity for retransmissions;

FIG. 4C a diagram illustrating another example multi-bit HARQ feedback, where the multi-bit HARQ feedback allows for CBG level granularity for retransmissions;

DETAILED DESCRIPTION

Figure 1B:
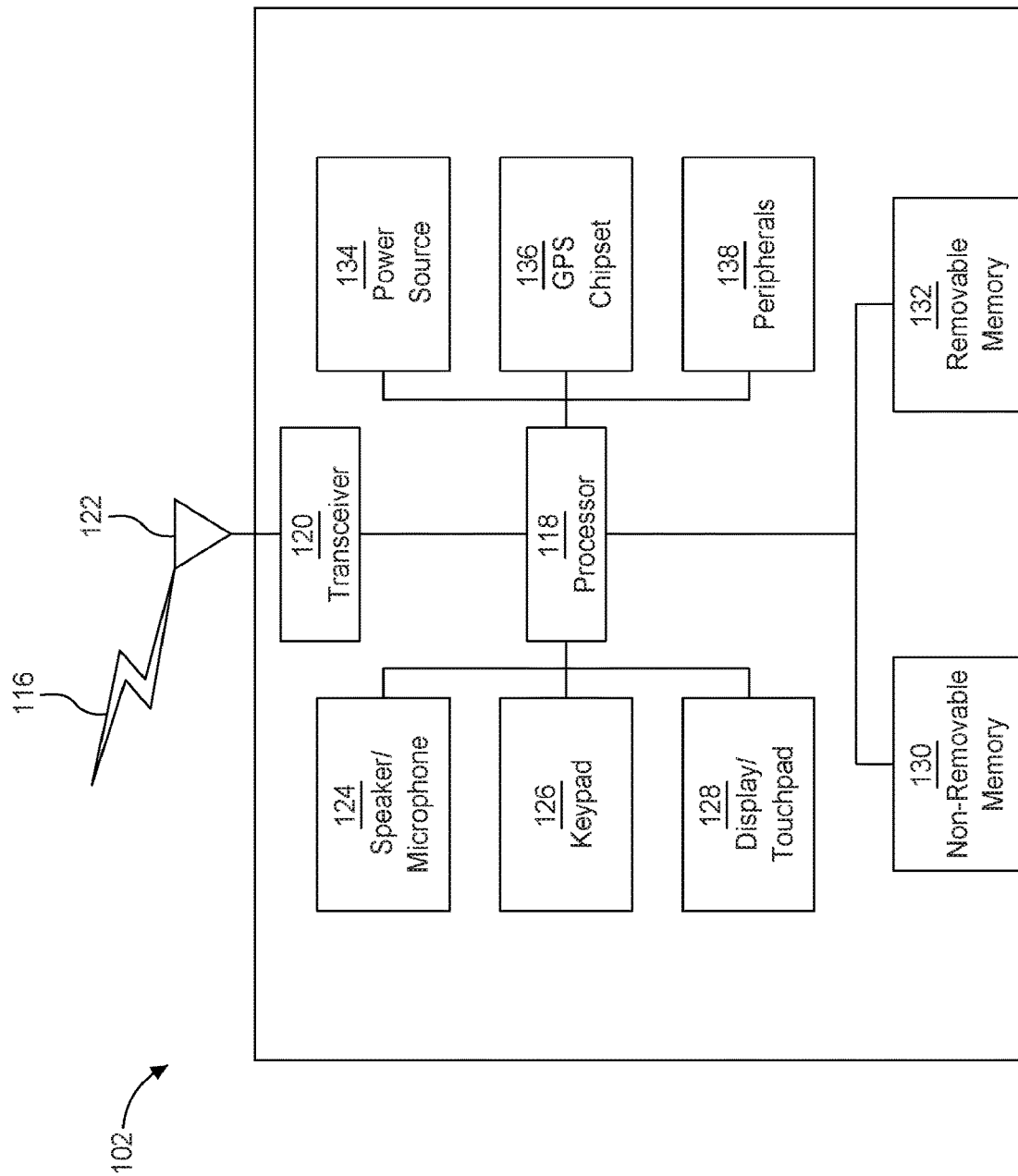
FIG. 1B is a system diagram illustrating an example wireless transmit/receive unit (WTRU) that may be used within the communications system illustrated in FIG. 1A according to an embodiment.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
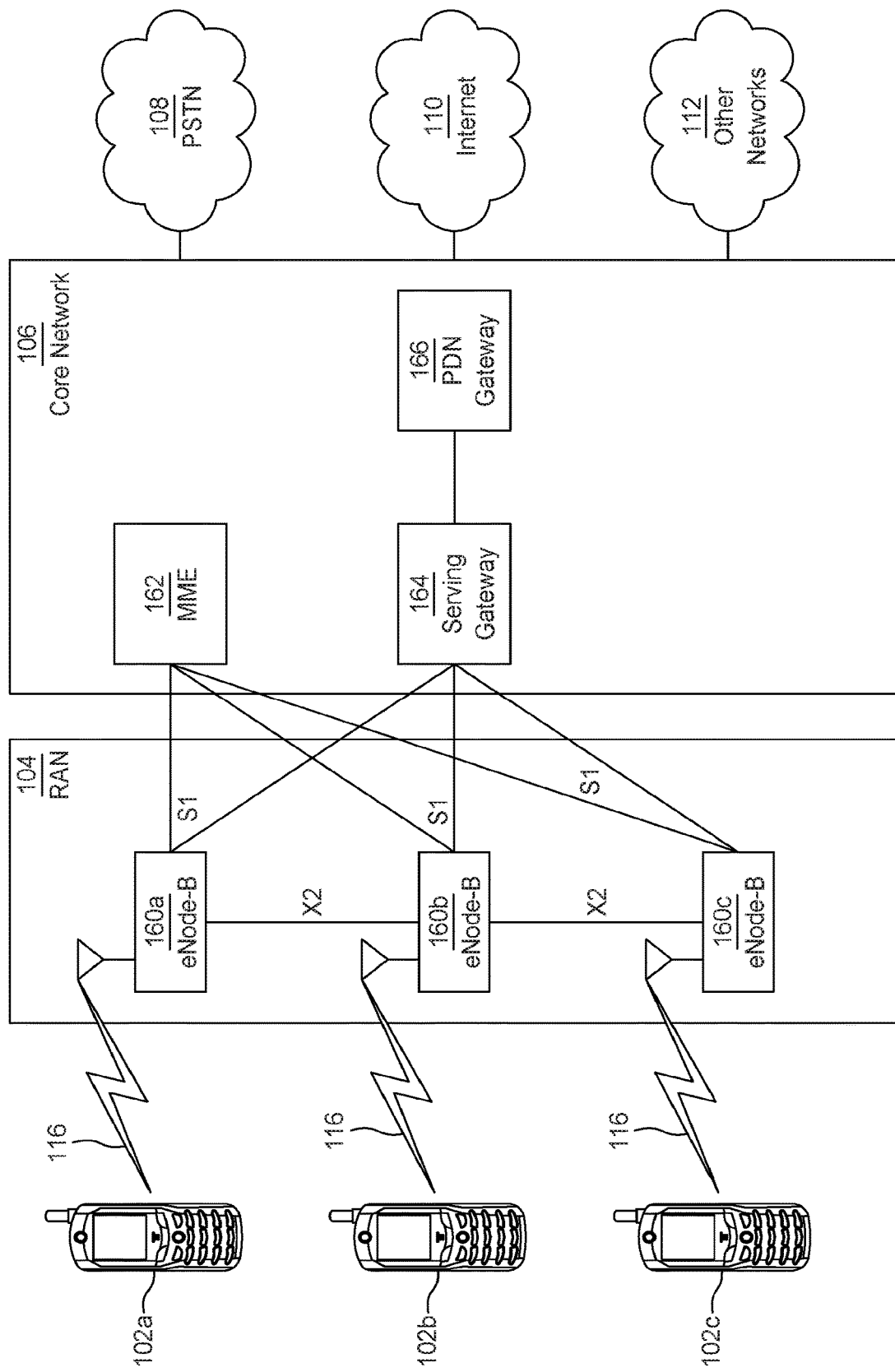
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
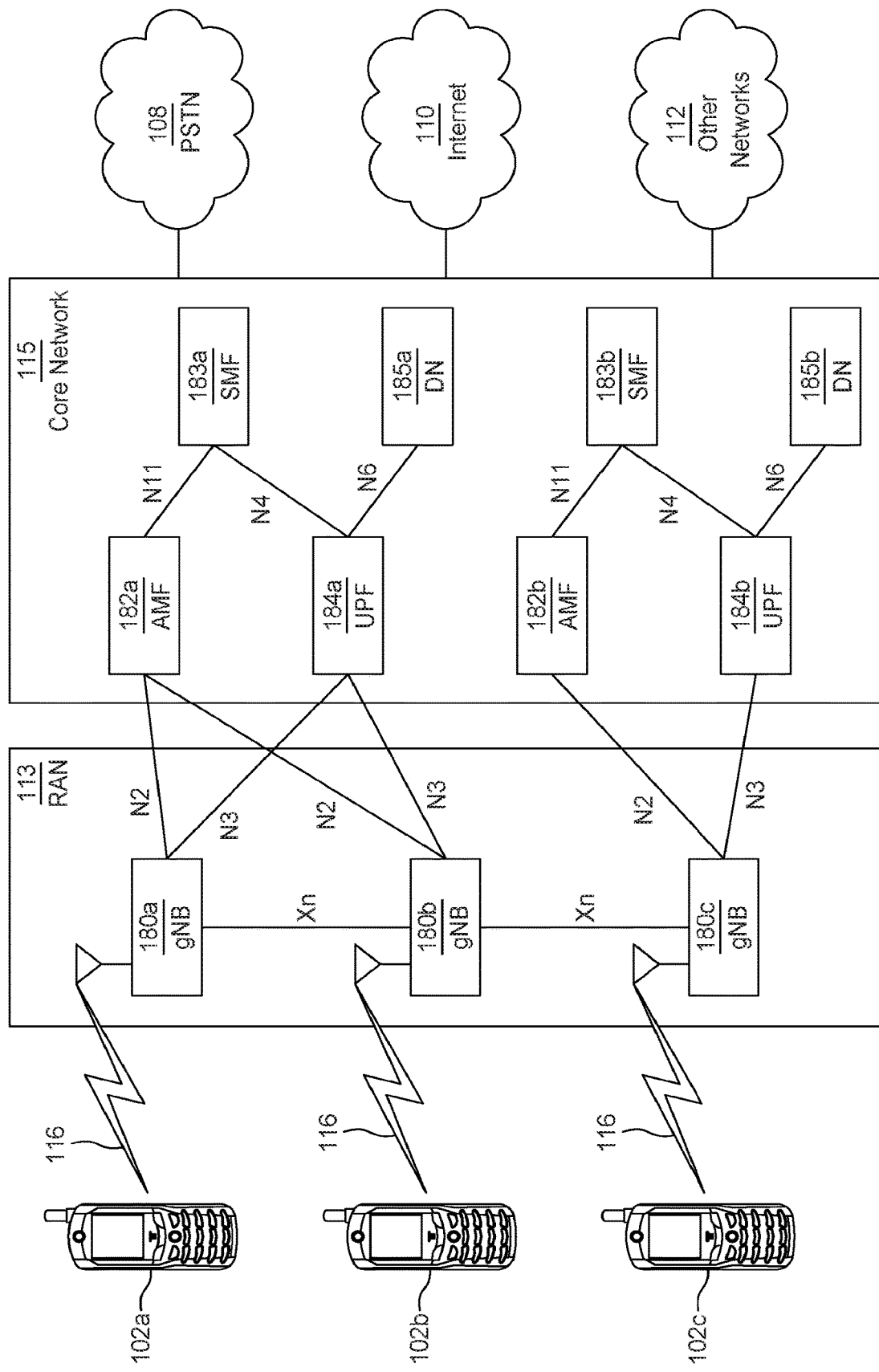
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In LTE, a turbo-coder interleaver is only defined for a limited number of code block (CB) sizes, the maximum block size being 6144 bits. As a result, if the transport block (TB), including the 24 bit TB cyclic redundancy check (CRC) exceeds this 6144 bit limit, each TB will be segmented into a smaller CB prior to turbo coding.

Figure 2:
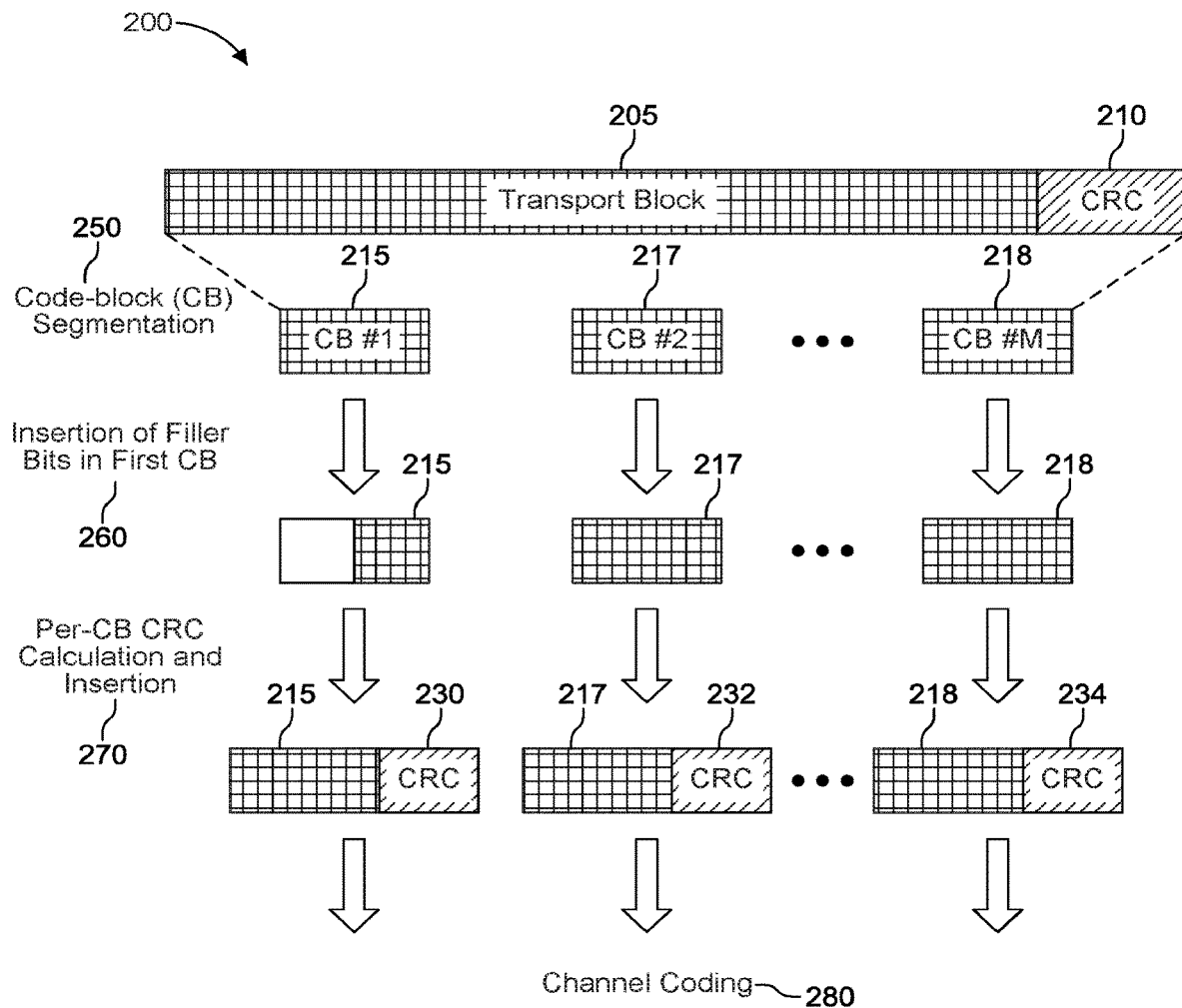
FIG. 2 is a diagram illustrating an example code block (CB) segmentation and cyclic redundancy check (CRC) insertion per CB.

FIG. 2 illustrates an example 200 of code block (CB) segmentation 250 and cyclic redundancy check (CRC) insertion per CB 270, which may be used in any combination of other embodiments described herein. As illustrated in FIG. 2, the CB segmentation 250 in a TB 205 may precede turbo coding process of inserting filler bits 260 to the CB #1 215 (i.e. filler to fit first CB to size supported by Turbo coder). During CB segmentation 250, each CB (i.e. CB #1 215, CB #2 217, CB #M 218) may have a CRC 230, 232, 234 appended to it. This CRC 230, 232, 234 may also include 24 bits in length, but different from the TB CRC 210. Having a CRC 230, 232, 234 per CB 215, 217, 218 may enable early detection of correctly decoded CBs for channel coding 280, which in turn allows for early termination of the iterative decoding process for that CB 215, 217, 218. This can be used to reduce WTRU processing complexity and energy consumption. The combination of TB CRC 210 and CB CRCs 230, 232, 234, may minimize the risk of undetected errors in the decoded TB.

In LTE, the size of TB, the transport block size (TBS), may be as large as 97,896 bits based on a system bandwidth of 20 MHz. This may result in roughly 16 CBs per TB. In LTE, when decoding for even a single CB fails, the entire TB is retransmitted. In New Radio (NR), where system bandwidths of 100 MHz for sub 6 GHz, and possibly up to the order of GHz for mmW bands, TBS may be much larger, for example, 80 CBs for 100 MHz based on scaling of the 20 MHz bandwidth for LTE.

In NR where multiple use cases such as enhanced Mobile Broadband (eMBB), ultra-reliable low latency communication (URLLC), and massive machine type communication (mMTC) are provided, efficient ways of utilizing the radio resources may be needed. For example, URLLC WTRUs may need to be serviced immediately in order to meet their stringent latency requirement. This may result in the need to preempt eMBB traffic, wherein resources scheduled for eMBB traffic may be preempted in order to serve URLLC traffic. This preemption of resources may be on a mini-slot (i.e. order of a symbol) level, impacting only a small number of CBs. Thus, retransmitting the entire TB as is the case for LTE would be inefficient and wasteful in terms of resources. As a result, there may be a need for a more flexible retransmission scheme that can operate based on a CB, a group of CBs (CBG), a TB, or any combination thereof.

Figure 3:
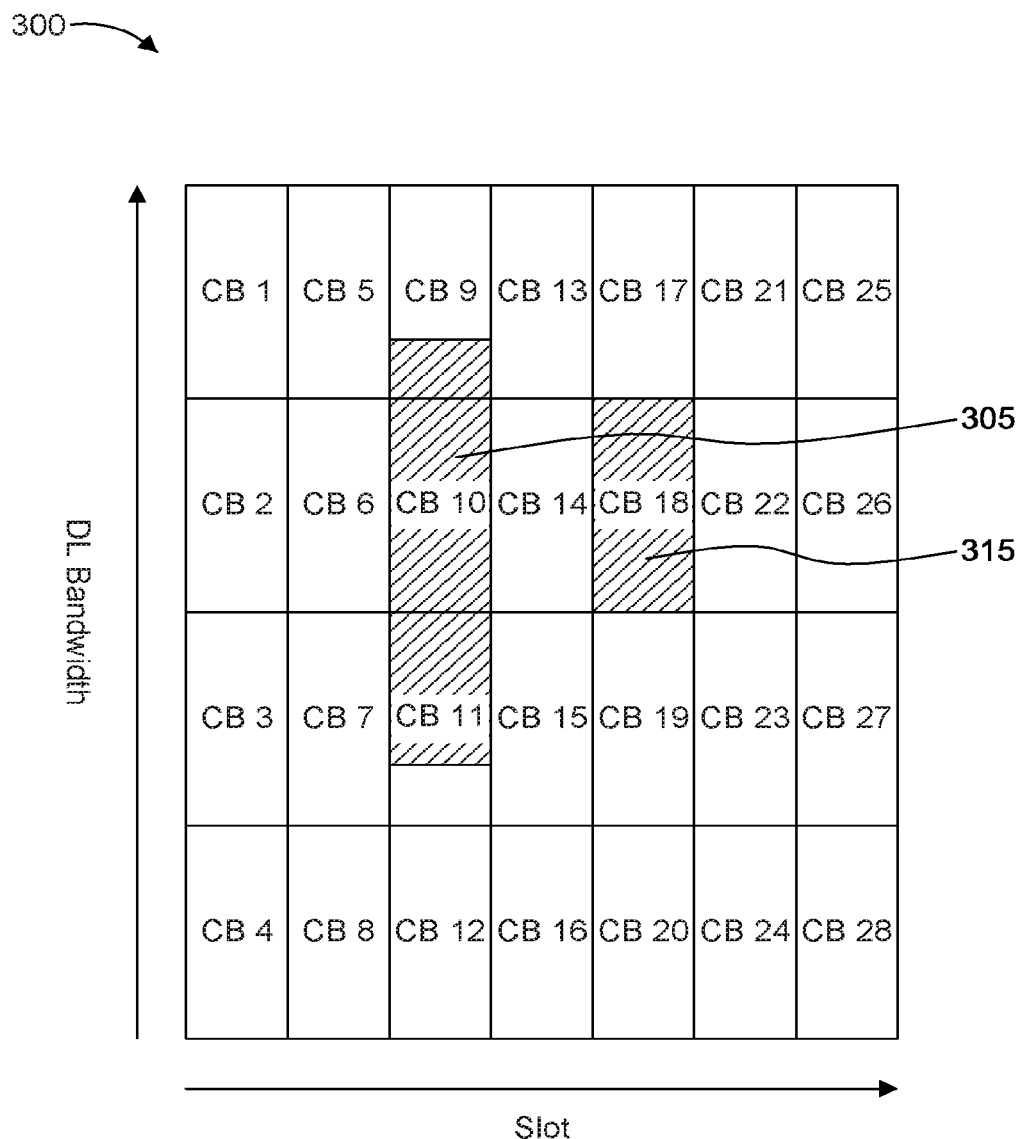
FIG. 3 a diagram illustrating an example pre-emption of enhanced mobile broadband (eMBB) traffic by ultra-reliable low latency (URLLC) traffic.

FIG. 3 illustrates an example pre-emption of enhanced mobile broadband (eMBB) traffic by ultra-reliable low latency (URLLC) traffic. For example, CBs 1 to 28 are originally scheduled for eMBB traffic. However, when URLLC traffics need to be serviced, CBs scheduled for eMBB traffic may be preempted in order to serve the URLLC traffic as shown in regions 305 and 315. In LTE, if CBs in the preempted regions 305, 315 (or any CB in regions for eMBB traffic) are not properly decoded, the entire TB needs to be retransmitted. As described above, this would result in very inefficient usage of radio resources.

In order to support CBG-based retransmission, multi-bit HARQ feedback may be needed. The multi-bit feedback may be used to indicate which CB/CBG or other resources (e.g., PRBs or group of PRBs) the WTRU is requesting retransmission from a base station (e.g., next generation Node B (gNB).

A WTRU or set/group of WTRUs may be semi-statically or dynamically configured to utilize no HARQ feedback, single-bit HARQ feedback, or multi-bit HARQ. This may be a function of both type/class of eMBB traffic being served (e.g., live streaming video vs. non-live video content) and the frequency of URLLC traffic that is preempting the eMBB traffic. Configuration (or reconfiguration) of the feedback formats for the WTRU may be determined by a BS (e.g., gNB) via signaling messages. For example, the semi-static configuration may be determined via RRC signaling and indicate that the type of HARQ feedback that the WTRU or set/group of WTRUs provides may not change for a long period of time. For example, when a WTRU is semi-statically configured to provide multi-bit HARQ feedback in a cell, the WTRU does not change its HARQ feedback configuration until it moves to a different cell that can only accept a single-bit HARQ feedback. In contrast, dynamic configuration may be determined via DCI and indicate that the type of HARQ feedback that the WTRU or set/group of WTRUs provides may change in a short period of time as it is needed. For example, DCI may include a parameter to change the type of HARQ feedback the WTRU is providing.

In an embodiment, if the eMBB traffic is comprised of primarily time sensitive traffic such as live streaming video and the URLLC traffic load is low, thereby leading to relatively infrequent preemption of eMBB resources, the BS (e.g., gNB) may either semi-statically or dynamically (re)configure the WTRU or group of WTRUs to utilize no HARQ feedback. The WTRU may then rely on forward error correction (FEC), since the loss of some packets is preferred to delay associated with HARQ based retransmissions for this type of service.

Alternatively or additionally, if the frequency of URLLC traffic is high, leading to high degree of preemption of eMBB resources, the BS (e.g., gNB) may semi-statically or dynamically (re)configure the affected WTRU or group of WTRUs to utilize multi-bit HARQ feedback. Upon receiving the multi-bit HARQ feedback, the BS may retransmit the affected portion of data so that the WTRU or group of WTRUs can decode the affected TB efficiently. These retransmissions may be CB/CBG, mini-slot level retransmissions, allowing the WTRU or group of WTRUs to benefit from the additional data transmission, while not dramatically impacting the viewer experience in terms of latency.

In another embodiment, the BS (e.g., gNB) may semi-statically configure a WTRU or group of WTRUs to use certain predetermined mappings for the multi-bit HARQ feedback. These mappings may indicate whether the multi-bit HARQ feedback allows for CB level granularity, CBG level granularity, or even Time-Frequency resources. Examples of such mappings are illustrated in FIGS. 4A-C.

FIG. 4A illustrates an example multi-bit HARQ feedback 405, which may be used in combination with any of other embodiments described herein. As illustrated in FIG. 4A, the multi-bit HARQ feedback 405 may allow for CB level granularity for retransmissions. Here, the granularity means the number of CB(s)/CBG(s) that is included in each bit of the multi-bit HARQ feedback (i.e. each HARQ information bit). Specifically, the CB level granularity means that each bit in the multi-bit HARQ feedback 405 may represent an individual CB. In this example, the multi-bit HARQ feedback 405 includes 12 HARQ information bits that represent each CB (i.e. CB1 to CB12). The 12 HARQ information bits may indicate respective CBs that the WTRU is requesting for retransmission. For example, if CB1 is not correctly decoded (i.e. corrupted), the WTRU may determine the first HARQ information bit representing the CB1 as NACK. If CB1 is successfully decoded, the WTRU may determine the first HARQ information bit as ACK. A HARQ information bit value of 0 may represent NACK while a HARQ information bit value of 1 may represent an ACK, or vice versa. This provides for maximum flexibility in that the WTRU may specify exactly which CBs it failed to successfully decode. Thus, the BS can minimize the usage of retransmission resources. This may be especially attractive for the case of small TB size. However, if TB size is even moderately large, this approach may need a large number of HARQ feedback bits, greatly increasing signaling overhead.

FIG. 4B illustrates an example multi-bit HARQ feedback 410 where the HARQ feedback 410 allows for code block group (CBG) level granularity for retransmissions, which may be used in combination with any of other embodiments described herein. The CBG level granularity means that each bit in the multi-bit HARQ feedback 410 may represent a group of CB (i.e. CBG) 415, 420, 425, 430. In this example, the multi-bit HARQ feedback 410 includes 4 HARQ information bits that represent each of CBGs 415, 420, 425, 430. Each of the 4 HARQ information bits may indicate respective CBGs 415, 420, 425, 430 that the WTRU is requesting for retransmission. For example, a first bit of the multi-bit HARQ feedback 410 represents a first CBG 415 (i.e. group of CB1, CB2, CB3) and indicates whether the first CBG is requested for retransmission or not. If any of CBs in the first CBG 415 is not correctly decoded (i.e. corrupted), the WTRU may determine the first HARQ information bit representing the first CBG 415 as NACK. If all of CBs in the first CBG 415 are successfully decoded, the WTRU may determine the first bit representing the first CBG 415 as ACK. As described above, an HARQ information bit value of 0 may represent NACK while a HARQ information bit value of 1 may represent an ACK, or vice versa.

FIG. 4C illustrates another example multi-bit HARQ feedback 435 where the HARQ feedback 435 allows for CBG level granularity for retransmissions, which may be used in combination with any of other embodiments described herein. The CBG level granularity means that a bit in the multi-bit HARQ feedback 410 may represent a group of CB (i.e. CBG) 440, 445. As illustrated in FIG. 4C, each HARQ information bit maps to a CBG 440, 445, in this case two CBG groups of 6 CBs each. For example, a first bit of the multi-bit HARQ feedback 435 represents a first CBG 440 (i.e. group of CB1, CB2, CB3, CB4, CB5, CB6) and indicates whether the first CBG is requested for retransmission or not. If all of CBs in the first CBG 415 are successfully decoded, the WTRU may determine the first bit representing the first CBG 440 as ACK. If any of CBs in the first CBG 440 is not correctly decoded (e.g., corrupted), the WTRU may determine the first HARQ information bit representing the first CBG 440 as NACK. In other words, any CB in the relevant CBG group being in error may result in a NACK feedback, thereby resulting in a retransmission of all CBs in that CBG. The WTRU may generate an ACK for the HARQ-ACK information bit of a CBG if the WTRU correctly received all code blocks of the CBG. The WTRU may generate a NACK for the HARQ-ACK information bit of a CBG if the WTRU incorrectly received at least one code block of the CBG. As described above, an HARQ information bit value of 0 may represent NACK while a HARQ information bit value of 1 may represent an ACK, or vice versa.

In an embodiment, a WTRU may be configured to utilize a plurality of HARQ feedback options. For example, a WTRU may be configured to provide both multi-bit HARQ feedback and single-bit HARQ feedback. The WTRU may have the flexibility to decide which one of the two to utilize, switching between the two if needed. For example, if the WTRU fails to successfully decode a small number of CBs for a particular TB, it may choose (or switch) to utilize the multi-bit HARQ feedback in order to signal which CBs the base station (e.g., gNB) should retransmit.

Alternatively or additionally, if the WTRU fails to decode a significant number of CBs (e.g., a large percentage of the entire TB), it may signify that the preemption has affected multiple CB/CBGs and the BS (e.g., gNB) may be better to retransmit the entire TB. In such a case, the WTRU may choose (or switch) to utilize single-bit HARQ feedback, informing the BS (e.g., gNB) to retransmit the entire TB, while also reducing signaling overhead. The BS (e.g., gNB) may configure the WTRUs with a threshold parameter, '6', in order to facilitate switching between single bit HARQ feedback and multi-bit HARQ feedback.

In order to facilitate switching between single-bit HARQ feedback requesting for TB-based retransmission and multi-bit HARQ feedback requesting for CBG-based retransmission, a WTRU may be configured by a BS (e.g., gNB) to utilize multiple PUCCH formats, each with a different payload (e.g., uplink control information (UCI)) size. The WTRU may then choose the appropriate PUCCH format based on HARQ feedback requirements. Under this scenario, the BS (e.g., gNB) may have to blind decode the PUCCH in order to ascertain which format and hence which feedback option is being utilized by the WTRU.

A WTRU may be configured via radio resource control (RRC) signaling, with multiple PUCCH resource sets, where the resource sets are divided on the basis of the UCI payload capability. For example, in a simple scenario, there may be 'K=2' configured resource sets. The first resource set may be defined for PUCCH formats that have HARQ-ACK feedback and hence a UCI payload size of up to 2 bits. However, the second resource set may be defined for PUCCH formats that have HARQ-ACK feedback and hence a UCI payload size of greater than 2 bits. In another example, a WTRU may be configured with 'K=3' resource sets, with additional granularity. For example, the first resource set may be defined for UCI payload size of up to 2 bits. The second resource set may be defined for PUCCH formats that utilize a UCI payload size of greater than 2 but less than 19 bits. The third resource set may be defined for UCI payload size of 20 or more bits. In yet another example, there may be 'K=4' PUCCH resource sets, with the first resource set being defined for UCI payload size of up to 2 bits and the second resource set being defined for PUCCH formats that utilize a UCI payload size of greater than 2 but less than 19 bits (as in the 'K=3' case). However, the third and fourth resource sets may provide increased granularity with the third resource set being defined from UCI payload sizes greater than 20 but less than some value 'L' (with L=80 as an example) and the fourth resource set being defined for UCI payload sizes >L.

There may be a tradeoff between the number of resource sets and the number of PUCCH resources (resource blocks) available per resource set. Having a larger number of PUCCH resource sets may result in few PUCCH resources per set since total number of PUCCH resources now have to be divided between a larger number of resource sets. Having a larger number of resources set may be beneficial if there is generally expected to be a substantial number of WTRUs that that may have higher UCI payloads. In this case, the distribution of these payloads is multi-modal, in which the PUCCH resource sets may be fine-tuned to the distribution of UCI payloads, thereby allowing for optimal usage of these resources. An example situation where having a larger number of resource sets may be beneficial may be when a large variation in UCI payload is possible. For the CBG-based (re)transmission case, this may occur when there is HARQ multiplexing of feedback, wherein a single HARQ feedback response may need to be provided for multiple PDSCH transmissions across multiple slots/CCs etc. In such a situation and especially for CBG-based (re)transmission, the number of HARQ bits may be substantial, for example, for a WTRU configured with 8 CBGs per TB, with five CCs, 40 bits of UCI payload for HARQ feedback may be expected, whereas for two CCs, 16 bits of UCI payload may be expected. In such a scenario having a larger number of PUCCH resource sets (e.g., 'K=4' as opposed to 'K=3') may be better, and the distribution of PUCCH resources between sets may be such that a higher number of resources are provisioned for the K=3 case, since it can be anticipated that the probability of providing 40 bits of HARQ feedback is much lower than the probability of providing between 3 and some intermediate number (e.g., 19 bits in the above for third set of the 'K=4' case) of HARQ and hence UCI payload.

The WTRU may then select the appropriate resource set based on the HARQ payload (UCI) size. As an example, in the above scenario where a WTRU that is configured with 2 CBGs per TB and a single codeword (CW) only, the WTRU may need to report multi-bit feedback of 2 bits. In such a case scenario, the WTRU may select the PUCCH resource set that is defined for PUCCH formats of UCI up to 2 bits (i.e. the first set in each of the above examples).

In another embodiment, a WTRU that is configured with 8 CBGs per TB for a single CW configuration may need to report a multi-bit feedback of size 8 bits. The WTRU may select PUCCH resource set defined for PUCCH format that is capable of supporting UCI of greater than 2 bits illustrated in the second set in the above examples.

In yet another embodiment, it is possible that a WTRU may be configured with multiple PUCCH resource sets, where more than one resource set is defined for PUCCH format that is capable of supporting a HARQ payload size (or more generally, UCI payload of certain size). For example, a WTRU may be configured with K=4 sets, where two sets are defined PUCCH format of UCI payload up to 2 bits, whereas the remaining two resource sets are defined for PUCCH format of UCI payload greater than 2 bits. In such a scenario, the WTRU may randomly pick between one of the two defined sets for either payload case. This may help reduce the possibility of a collision between multiple WTRUs in the case where there are a large number of WTRUs assigned per PUCCH resource set.

If the selected PUCCH format is capable of a moderate UCI (HARQ) payload and transmitted over multiple/several symbols/min-slots/sub-slots (e.g., PUCCH over a long duration such as PUCCH format 4 over a single resource-block pair), in order to efficiently exploit the PUCCH resource set, multiple WTRUs may share the same resource-block pair. The devices sharing the same resource-block pair within a symbol/mini-slot may be separated by different orthogonal phase rotations of a frequency domain sequence (e.g., cyclic shift in time domain). Alternatively or additionally, for a larger UCI payload format, for example, greater than 2 bits, where multiple resource-block pairs are used (e.g., PUCCH formats 2 or 3), the multiplexing capacity for the symbols/mini-slots/non-slots may be increased by having multiple WTRUs share the same resource block pair with each WTRU using different orthogonal cover sequences. Thus, this may reduce the number of PUCCH resources that may be needed for HARQ feedback.

In addition to the selecting the appropriate resource set (e.g., based on HARQ-ACK payload size), the BS (e.g., gNB) may fine tune the PUCCH resource that will be used by the WTRU in order to provide its HARQ feedback. This may be done by utilizing an ACK-NACK resource indicator (ARI) field similar to the 2-bit ACK-NACK offset field (ANO) in LTE, which may be used to dynamically control the PUCCH resource and/or format within the PUCCH resource set.

In one embodiment, a 2-bit ARI may provide the index of PUCCH resource as follows; 00 indexes the first PUCCH resource, 01 indexes the second PUCCH resource, 10 indexes the third PUCCH resource, while 11 indexes the fourth PUCCH resource within the selected PUCCH resource set.

In another embodiment, the ARI may provide an index of a PUCCH resource index for a particular PUCCH format. For example, if a WTRU is configured for both short and long PUCCH for a UCI payload of greater than 2 bits, it may be configured with two different PUCCH formats. In an embodiment, one PUCCH format may be used for short PUCCH and the other PUCCH format may be used for long PUCCH transmission. The ARI index may then be utilized to provide information regarding the PUCCH resource indices as well as the PUCCH format. For example, based on the ARI index, a WTRU may select a PUCCH resource set with two PUCCH formats (e.g., PUCCHa and PUCCHb) both capable of carrying a UCI payload greater than 2 bits, with one format (e.g., PUCCHa) for short duration PUCCH transmission and the other format (e.g., PUCCHb) for long duration. Specifically, ARI index 00 may indicate PUCCH resource 1 for PUCCHa, index 01 may indicate PUCCH resource 2 for PUCCHa, index 10 may indicate PUCCH resource 1 for PUCCHb, while index 11 may indicate PUCCH resource 2 for PUCCHb.

In yet another embodiment, a WTRU that is configured with both short and long PUCCH formats may decide one PUCCH format based on certain predetermined criteria. For example, if the WTRU is limited power or constrained coverage, the WTRU may decide to utilize the long PUCCH format. In such a case, the WTRU having the flexibility to pick the best/appropriate PUCCH format may use the ARI field in the DCI solely for the indication of PUCCH resource index.

In addition, having the flexibility to select the appropriate PUCCH resource may allow the WTRU to adapt to any changes of feedback granularity that may result. For example, a WTRU that is configured to provide multi-bit HARQ feedback for CBG-based (re)transmission may respond with single-bit HARQ feedback for TB-based (re) transmission if the BS (e.g., gNB) schedules the PDSCH using a fallback DCI on the PDCCH. The fallback DCI may indicate that the BS does not support a CBG-based retransmission for transmitted transport blocks (TBs). When the WTRU receives the fallback DCI, the WTRU may choose the PUCCH resource set that is configured for the PUCCH format supporting the smaller UCI payload size of 2 bits because this would suffice for single-bit HARQ feedback that is requesting retransmission of a single or two codeword (or TB). In this way, a WTRU first configured to provide multi-bit HARQ feedback may switch between multi-bit HARQ feedback for CBG-based retransmission (by utilizing a resource set that is configured for a higher UCI payload) and single-bit HARQ feedback for TB-based retransmission (by utilizing a resource set that is configured for a smaller UCI payload size). For this fallback DCI case, the BS (e.g., gNB) may provide updated PUCCH resource index information (via ARI field) taking account of the fact that the WTRU may have switched to a different PUCCH resource set because the HARQ payload size has been changed (from multi-bit HARQ feedback to single-bit HARQ feedback) and the PUCCH format has also been changed accordingly. The new ARI may then be modified to reflect the PUCCH resource index information for this PUCCH resource set.

In an embodiment where a WTRU is transmitting data on PUSCH, the WTRU may choose to utilize multi-bit HARQ feedback in order to provide a finer granularity for retransmissions. In this example, the WTRU may also switch from the multi-bit HARQ feedback to single-bit HARQ feedback based on a more stringent threshold parameter '$\delta_s$' (where $\delta_s > \delta$) This is more stringent than the case where HARQ feedback is sent on PUCCH, for example, $\delta_s = 1$, implying a switch to single bit only if the entire TB is in error.

In another embodiment, a WTRU may be configured to provide a plurality of HARQ feedback options such as providing both multi-bit HARQ feedback and single-bit HARQ feedback simultaneously to the BS (e.g., gNB). Providing both types of HARQ feedback may require built-in error detection and added robustness for HARQ feedback error. As an example, a WTRU with a single CBG that is affected by pre-emption may provide both multi-bit HARQ feedback for the affected CBG and single-bit feedback for the TB. This means that the multi-bit HARQ feedback includes a single NACK for the affected CBG and the single-bit HARQ feedback includes a single NACK for the TB. If either NACK bit is affected by NACK-ACK error, the BS (e.g., gNB) may still be able to tell that at least some part of the TB was not correctly decoded by the WTRU. In this case, the BS (e.g., gNB) may decide to retransmit the entire TB (if the single NACK for the affected CBG is flipped to an ACK) or only retransmit the CBG for which it received the NACK. Although the former case (i.e. retransmitting the entire TB) may result in unnecessary transmissions, it may be preferable to the alternative (i.e. retransmitting the affected CBG) because retransmitting the affected CBG may have to take longer than retransmitting the entire TB (i.e.

until the successful reception of the entire TB) due to potential correction by the RLC protocol.

A WTRU configured to provide multi-bit HARQ feedback may also revert to or utilize single-bit feedback as a fallback option as a method for reducing feedback overhead. The WTRU may be configured with both multi-bit HARQ feedback and single-bit HARQ feedback options, and may provide multi-bit HARQ feedback as long as the (re)transmissions scheduled by the BS (e.g., gNB) results in at least one (re)transmitted CBG being in error (i.e. NACK). Once all CBGs (and hence the entire TB) has been successfully received by the WTRU, the WTRU may then send a single-bit HARQ feedback message in order to inform the BS (e.g., gNB) that the entire TB has now been successfully received. This multi-bit HARQ feedback to single-bit HARQ feedback switching may result in reduced overhead while having no negative impact on performance.

In another embodiment, a WTRU configured with both multi-bit HARQ feedback and single-bit HARQ feedback options may decide to choose single-bit HARQ feedback for TB-based retransmission, if a significant number of CBGs are undecodable due to pre-empted data (e.g., based on some threshold such as an absolute number of CBGs or percentage/fraction of configured CBGs). In such a case, the WTRU may decide that it may be best to request retransmission of the entire TB. In order to request retransmission of the entire TB, the WTRU may send a single-bit HARQ-NACK.

In yet another embodiment, a WTRU configured for multi-bit HARQ feedback (or configured for both multi-bit HARQ feedback and single-bit HARQ feedback) may be required to switch to (or choose) single-bit feedback due to the change in the DCI utilized to schedule the PDSCH. For example, if a WTRU configured with multi-bit HARQ feedback for CBG-based (re)transmission and the PDSCH scheduled via a DCI does not support CBG-based transmission, the WTRU may need to switch to (or choose) single-bit HARQ feedback because a fallback DCI format is utilized. In such a scenario, scheduling the PDSCH with the fallback DCI may be regarded as an indication that the WTRU needs to respond with a single-bit HARQ feedback for TB-based retransmission. The regular DCI (or non-fallback DCI) may be regarded as an indication that the WTRU should respond with multi-bit HARQ feedback for CBG (or CB) based retransmission.

Each PDCCH may carry a message known as DCI, which includes resource assignments and other control information for a WTRU or group of WTRUs. For example, a DCI can transport downlink and uplink scheduling information, requests for aperiodic channel quality indicator (CQI) reports, or uplink power control commands for one cell and one radio network temporary identifier (RNTI). Depending on the information content, DCI may have different DCI message formats as shown in Table 1 below.

TABLE 1

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of WTRUs of the slot format |
| 2_1 | Notifying a group of WTRUs of the PRB(s) and OFDM symbol(s) where WTRU may assume no transmission is intended for the WTRU |

TABLE 1-continued

| DCI format | Usage |
|---|---|
| 2_2 | Transmission of TPC commands for PUCCH and PUSCH |
| 2_3 | Transmission of a group of TPC commands for SRS transmissions by one or more WTRUs |

For example, DCI format 1_1 used for scheduling of PDSCH in one cell may include a field indicating a code block group (CBG) based (re)transmission for at least one transport block (TB), The regular DCI (or non-fallback DCI) may be this DCI format 1_1 to explicitly indicate that the WTRU should respond with multi-bit HARQ feedback for CBG (or CB) based retransmission. On the other hand, DCI format 1_0 used for the scheduling of PDSCH in one DL cell, may not include the field indicating a CBG-based (re)transmission. In this scenario, scheduling the PDSCH with the DCI format 1_0 may be regarded as an implicit indication that the WTRU needs to respond with single-bit HARQ feedback for TB-based (re)transmission. As describe above, the WTRU, upon receiving DCI format 1_0, may switch or choose single-bit HARQ feedback for CBG-based retransmission. Moreover, if the WTRU receives a PDSCH that is scheduled by a PDCCH with DCI format 1_0, the WTRU may generate HARQ feedback information only for the transport block in the PDSCH. The fallback DCI described above may be this DCI format 1_0.

Selection, by a WTRU, of the PUCCH resource/format may differ based on whether the WTRU switched from multi-bit HARQ feedback to single-bit HARQ feedback purely based on its own decision making (e.g., based on how many CBGs were in error as described above) or whether it was based on a change in how the PDSCH was scheduled by the BS (e.g., gNB) (e.g., fallback DCI). In the latter case where the switching is due to fallback DCI, the BS (e.g., gNB) may dynamically indicate the ARI for the PUCCH resource to be used from the selected PUCCH resource set, where the set selection may be based on UCI payload size as mentioned previously. This dynamically indicated resource may then be used by the WTRU for the single-bit HARQ feedback.

In the case where the WTRU autonomously decides to switch from multi-bit HARQ feedback to single-bit HARQ feedback, the WTRU may utilize a pre-configured PUCCH resource (e.g., uplink control information (UCI)). For this purpose, the BS (e.g., gNB) may semi-statically configure a PUCCH resource which includes the appropriate PUCCH resource set. In this case, the PUCCH resource set may be the set configured to handle UCI payloads of less than 2 bits (PUCCH formats 0/1). This preconfigured resource may override the PUCCH resource that is dynamically indicated via the ARI in the non-fallback based DCI that schedules the PDSCH for the CBG-based (re)transmission. It is because the PUCCH resource indicated in this DCI was specific to a multi-bit feedback payload size and the corresponding PUCCH resource.

Alternatively or additionally, the WTRU may utilize the PUCCH resources that are specified for the multi-bit HARQ feedback for the purpose of providing the BS (e.g., gNB) with single-bit HARQ feedback. In this case, both PUCCH formats such as PUCCH format 0 and PUCCH format 2 may be used for the same PUCCH resource. For example, that the PUCCH format 0 may be specified for UCI payloads of 1-2 bits and the PUCCH format 2 may be defined for UCI payloads of greater than 2 bits.

In the preceding examples, information regarding the number of configured PUCCH resource sets and their UCI payload capabilities may limit the ability of the WTRU to autonomously decide between single-bit HARQ feedback or multi-bit HARQ feedback when the WTRU provides a HARQ response for the transmitted PDSCH. For example, if a WTRU is configured with only a single PUCCH resource set with a small UCI payload capability, the WTRU may take this an indication that it is expected to always respond with single-bit HARQ. However, if a WTRU is configured with a PUCCH resource set with a large UCI payload capable of carrying a large UCI payload, the WTRU may take this as an explicit indication that it is expected to always respond with multi-bit HARQ feedback for this PDSCH.

In yet another embodiment, a WTRU configured with more than one PUCCH resource set may take this as an implicit indication that it is up to the WTRU to select the appropriate feedback granularity. In this case, the BS (e.g., gNB) may need to blind decode the PUCCH in order to ascertain which PUCCH format was selected by the WTRU.

Alternatively or additionally, a WTRU configured with only a multi-bit HARQ feedback option may utilize this configuration to provide TB-level feedback. As illustrated in FIG. 2, a TB 205 has a CRC 210 and each CB (i.e. CB #1 215, CB #2 217, CB #M 218) has a CRC 230, 232, 234 appended to it. After the WTRU receives the TB 205 including all CBs 215, 217, 218, if the CB-level CRC check at the WTRU passes but the TB level CRC check at the WTRU fails, the multi-bit HARQ feedback field may comprise this TB level NACK feedback. This TB level NACK feedback (e.g., NACK feedback bit 0) may be repeated N times where N is the number of CBGs/CBs or N is the maximum number of CBGs/CBs. For example, a WTRU that is semi-statically configured to provide multi-bit HARQ feedback receives two TBs that comprise 16 CBGs where each TB includes 8 CBGs. If all the CB-level CRC and TB-level CRC checks for the first TB are passed, the WTRU may generate TB level ACK feedback by repeating an ACK information bit 8 times (i.e. 11111111). If all the CB-level CRC checks are passed but TB-level check is failed for the second TB, the WTRU may generate TB level NACK feedback by repeating a NACK information bit 8 times (i.e. 00000000). Since the WTRU is semi-statically configured to provide multi-bit HARQ feedback, the number of bits in the multi-bit HARQ feedback may need to be the maximum number of CBGs (in this example, 16 bits). Thus, after the two 8 bits (i.e. 11111111 for the first TB and 00000000 for the second TB) are multiplexed, the WTRU may generate 16 bits multi-bit HARQ feedback (i.e. 1111111100000000).

In other words, if the WTRU correctly detects each of the N CBGs and does not correctly detect the TB for the N CBGs, the WTRU may generate NACK bits for each of the N CBGs. On the other hand, if the WTRU correctly detects each of the N CBGs and also correctly detects the TB for the N CBGs, the WTRU may generate ACK bits for each of the N CBGs. If one or more TBs are used, the single HARQ codebook for each TB needs to be multiplexed, thereby generating multi-bit HARQ feedback. Such an approach may help adding redundancy to HARQ feedback, thereby reducing probability of misdetection, reducing delay, and incurring no additional overhead/cost, because the WTRU is already configured to use a PUCCH format intended to carry a multi-bit feedback format payload.

In an embodiment, if a WTRU receives a PDSCH that is scheduled by a PDCCH with a fallback DCI and the WTRU is semi-statically configured with a higher layer parameter to provide multi-bit HARQ feedback, the WTRU may repeat the HARQ ACK or NACK N times (i.e. the number of CBG or the maximum number of CBG configured by the BS) for the TB in the PDSCH to generate N HARQ ACK or NACK information bits.

Figure 5:
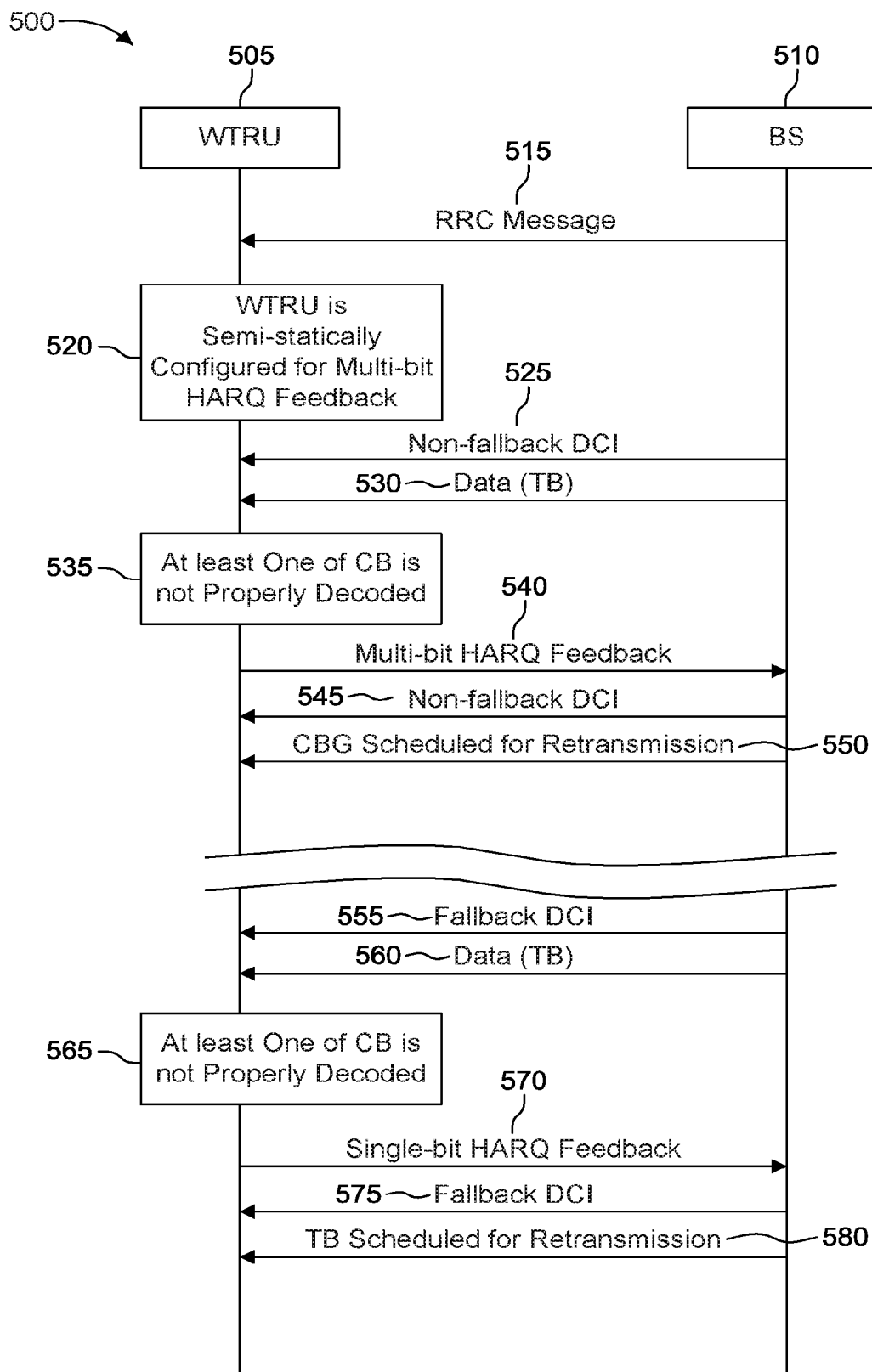
FIG. 5 is a diagram illustrating an example signaling procedure for providing single-bit HARQ feedback and/or multi-bit HARQ feedback based on downlink control information (DCI)

FIG. 5 illustrates an example signaling procedure 500 for providing a single-bit HARQ feedback and/or a multi-bit HARQ feedback based on DCI, which may be used in any combination of other embodiments described herein. As illustrated in FIG. 5, a WTRU 505 may receive a radio resource control (RRC) message 515 from a base station (BS) 510. The RRC message 515 may be interchangeably referred to as a higher layer message where the layer transmitting the message is higher than a medium access control (MAC) layer. The RRC layer is located in the BS (e.g., gNB/eNB) and may handle control plane protocols. For example, the RRC layer manages RAN related procedures such as broadcasting of system information, connection management, mobility, WTRU capabilities or the like. These messages may be transmitted using radio bearers, which are mapped to either common or dedicated control channels.

The RRC message 515 may include a higher layer parameter (e.g., CBG-DL=ON) that semi-statically configures the WTRU to provide multi-bit HARQ feedback based on a maximum number of CBGs for CBG-based (re)transmission at step 520. For example, if the WTRU is configured by the higher layer parameter that includes the maximum number of CBGs, the WTRU may need to use the maximum number of CBGs for generating respective HARQ feedback information bits for a TB reception. For example, if a received TB includes 8 CBGs but the maximum number of CBGs configured by the higher layer parameter is 10, the WTRU may generate 10 HARQ information bits for multi-bit HARQ feedback. In this case, the first 8 bits may be determined by the result of decoding CBG (or TB), and the last 2 bits may be added or inserted based on dummy bits (e.g., ACK or NACK bits). The payload size of multi-bit HARQ feedback may be determined by the configured number of CBGs. For example, the payload size of multi-bit HARQ feedback may be the same with the maximum number of CBGs.

After receiving the RRC message 515, the WTRU 505 may be configured to provide multi-bit HARQ feedback and/or single-bit HARQ feedback as described above. The WTRU 505 may receive, via PDCCH, regular (non-fallback) DCI 525 for PDSCH scheduling. Based on the regular DCI 525, the WTRU may receive data (i.e. TB(s)) 530 over the PDSCH. Since the WTRU 505 received the regular DCI 525, when at least one CB in the received TB(s) is not properly decoded at step 535, the WTRU 505 may transmit multi-bit HARQ feedback 540 to the BS 510 over PUCCH. This multi-bit HARQ feedback 540 may be included in UCI. The multi-bit HARQ feedback 540 may also include one or more HARQ NACK information bits for the CBG(s) that the WTRU 505 is requesting for retransmission. After transmitting the multi-bit HARQ feedback 540, the WTRU 505 may receive regular (non-fallback) DCI 545 over PDCCH for CBG(s) 550 that are scheduled for retransmission. If the regular DCI 545 schedules the retransmission of CBG(s), the DCI 545 may include a CBG transmission information (CBGTI) field. The CBGTI field may include a bit map that has a one-to-one mapping with each CBG of the TB. The WTRU 505 may determine whether a CBG is retransmitted based on a corresponding value of the CBGTI field. For example, a binary 0 indicates that a corresponding CBG is retransmitted and a binary 1 indicates that a corresponding CBG is not retransmitted.

The WTRU 505 may also receive fallback DCI 555 over PDCCH for PDSCH scheduling. Based on the fallback DCI 555, the WTRU may receive data (i.e. TB(s)) 560 over the PDSCH. Since the WTRU 505 received the fallback DCI 555, when at least one CB in the received TB(s) is not properly decoded at step 565, the WTRU 505 may transmit single-bit HARQ feedback 570 to the BS 510 over PUCCH. This single-bit HARQ feedback 570 may also be included in UCI. The single-bit HARQ feedback 570 may include a HARQ NACK information bit for the TB that the WTRU 505 is requesting for retransmission. After transmitting the single-bit HARQ feedback 570, the WTRU 505 may receive fallback DCI 575 over PDCCH for TB 580 that is scheduled for retransmission. If the single-bit HARQ feedback 570 is NACK (i.e. binary 0), the WTRU 505 may receive a corresponding TB that is retransmitted by the BS 510. If the single-bit HARQ feedback 570 is ACK (i.e. binary 1), the WTRU 505 does not receive any further retransmission from the BS 510.

Figure 6:
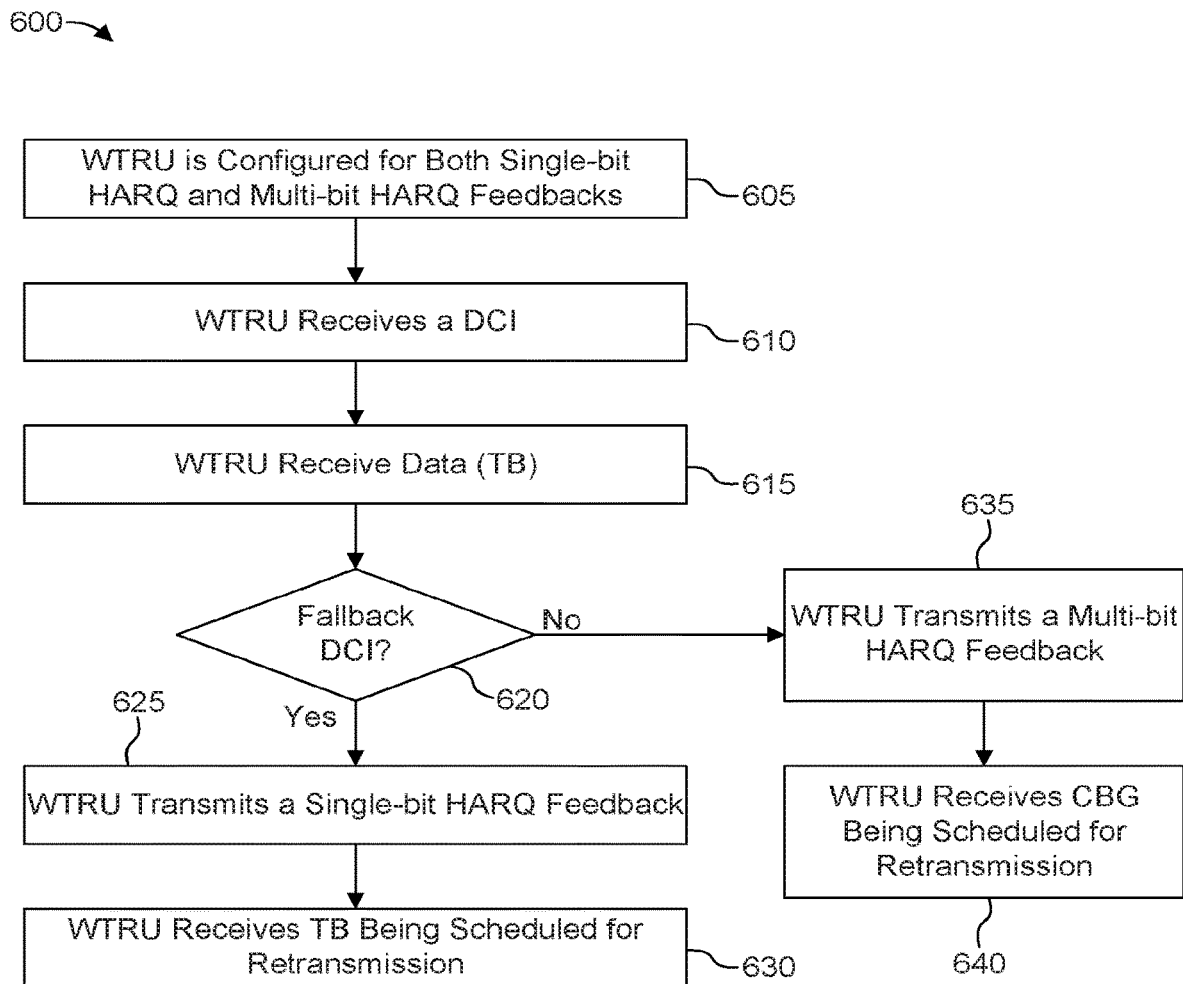
FIG. 6 is a diagram illustrating an example procedure for providing single-bit HARQ feedback and/or multi-bit HARQ feedback based on downlink control information (DCI)

FIG. 6 illustrates an example procedure 600 for providing a single-bit HARQ feedback and/or a multi-bit HARQ feedback based on DCI, which may be used in any combination of other embodiments described herein. At step 605, a WTRU may be configured to provide multi-bit HARQ feedback and/or single bit HARQ feedback as described above. At step 610, the WTRU may receive a DCI over PDCCH for PDSCH scheduling. At step 615, the WTRU may receive data (i.e. TB). At step 620, if the received DCI is a fallback DCI and at least one CB in the received TB is not correctly decoded, the WTRU may transmit a single-bit HARQ feedback at step 625. If the single-bit HARQ feedback 570 is NACK (i.e. binary 0), the WTRU may receive a corresponding TB that is retransmitted by the BS 510 at step 630.

At step 620, if the received DCI is a non-fallback DCI and at least one CB in the received TB is not correctly decoded, the WTRU may transmit a multi-bit HARQ feedback at step 635. The multi-bit HARQ feedback may include one or more HARQ NACK information bits for the CBG(s) that the WTRU is requesting for retransmission. After transmitting the multi-bit HARQ feedback at step 635, the WTRU may receive regular (non-fallback) DCI over PDCCH for CBG(s) that are scheduled for retransmission. If the regular DCI schedules the retransmission of CBG(s), the regular DCI may include a CBG transmission information (CBGTI) field. The CBGTI field may include a bit map that has a one-to-one mapping with each CBG of the TB. The WTRU may determine whether a CBG is retransmitted based on a corresponding value of the CBGTI field. For example, a binary 0 indicates that a corresponding CBG is retransmitted and a binary 1 indicates that a corresponding CBG is not retransmitted. At step 640, based on the CBGTI field, the WTRU may receive CBG(s) that are retransmitted by the BS.

Figure 7:
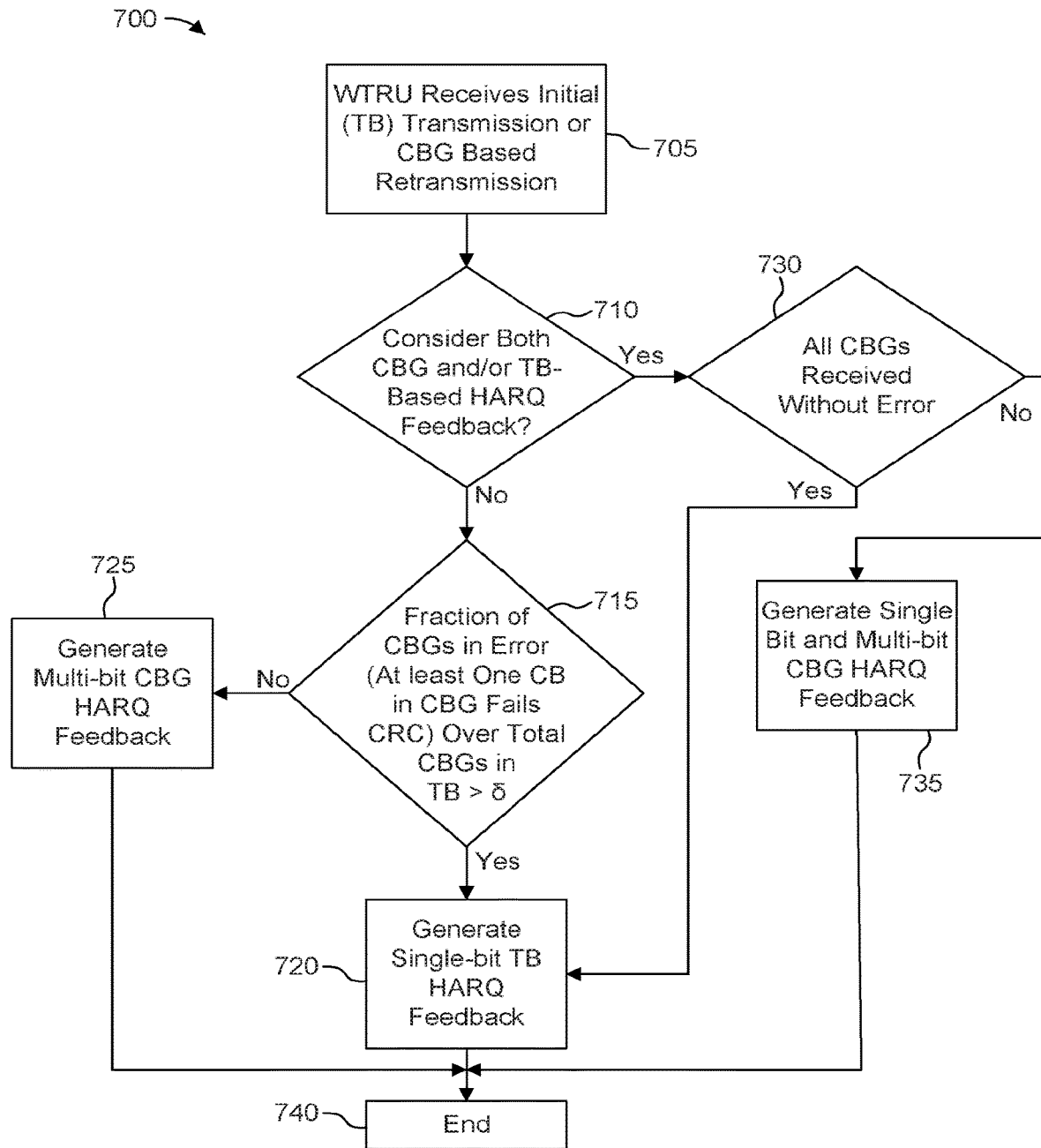
FIG. 7 a diagram illustrating an example procedure for determining single-bit HARQ feedback and/or multi-bit HARQ feedback that a WTRU is to provide.

FIG. 7 illustrates an example procedure 700 for determining a single-bit HARQ feedback and/or a multi-bit HARQ feedback that a WTRU is to provide, which may be used in any combination of other embodiments described herein. At step 705, a WTRU may receive an initial (TB) transmission or CBG-based retransmission from a BS. At step 710, the WTRU may consider which HARQ feedback the WTRU is to provide among single-bit HARQ feedback and/or multi-bit HARQ feedback. At step 730, if the WTRU determines to consider both single-bit HARQ feedback and multi-bit HARQ feedback, the WTRU may first check whether all CBGs received from the BS has no error. If there is no error in all the received CBGs, the WTRU may generate a single-bit HARQ feedback at step 720. This may be a single-bit HARQ ACK. If there is error in the received CBGs, the WTRU may generate a single-bit HARQ feedback and multi-bit HARQ feedback at step 735. This may be relevant to the case where the WTRU is providing HARQ feedback for multiple TBs (e.g., PDSCHs) via a single HARQ feedback message by multiplexing the single-bit and multi-bit HARQ feedbacks.

At step 710, if the WTRU determines not to consider which HARQ feedback the WTRU is to provide among single-bit HARQ feedback and/or multi-bit HARQ feedback, the WTRU may consider other factors to determine which HARQ feedback the WTRU choose. For example, at step 715, the WTRU may consider faction of CBGs in error over total CBGs in TB. If the fraction of CBGs in error over the total CBGs in TB is greater than a predetermined threshold (6), the WTRU may generate single-bit HARD feedback for TB-based retransmission at step 720. If the fraction of CBGs in error over the total CBGs in TB is less than a predetermined threshold (6), the WTRU may generate multi-bit HARD feedback for CBG-based retransmission at step 725. Lastly, the WTRU may transmit the determined HARQ feedback to the BS at step 740.

In one embodiment, WTRUs may be configured to utilize just multi-bit HARQ feedback options. The multi-bit HARQ feedback options may be CB-based, CBG-based or may switch between CB-based and CBG-based. For example, a WTRU or group of WTRUs may be semi-statically configured to utilize multi-bit HARQ for CBG-based retransmissions. The network may over time infer that the low latency traffic is periodic in nature, requiring a transmission opportunity every 'X' ms, which may translate to a limited number of CBs for a WTRU or group of WTRUs. In such a case, it would benefit the system to switch to CB-based multi-bit HARQ feedback. In order to do this, the BS (e.g., gNB) may dynamically (re)configure the affected set of WTRUs.

In another embodiment, WTRUs served by a BS (e.g., gNB) may be initialized with a default HARQ feedback setting. The initial/default HARQ feedback setting may be single-bit HARQ feedback or multi-bit HARQ feedback. In the case that multi-bit HARQ feedback is the default setting, the system may have a predefined maximum number of bits 'N_max', where each bit is either applied to a CB or CBG which comprises multiple CBs. In addition, each bit whether it is applied to a CB or CBG is able to cover the maximum TBs for the system. The choice of N_max may provide a trade-off between flexibility in terms of being able to allow for selection of a fine enough granularity for the retransmissions while maintaining low to moderate complexity in terms of the maximum possible value of N_max.

In order to allow for CBG-based retransmission, the BS (e.g., gNB) may need to schedule both TB-based initial transmissions and CBG-based (re)transmissions. The BS (e.g., gNB) may use a scheduling assignment (e.g., fallback DCI) in order to schedule the initial TB-based transmission, while utilizing a separate DCI format (e.g., non-fallback DCI) in order to schedule CBG-based (re)transmissions. The scheduling assignment (i.e. DCI) may include fields such as modulation and coding scheme (MCS), redundancy version (RV), new data indicator (NDI) or the like. Alternatively or additionally, the scheduling assignment may contain a CBG indicator field (CBGIF) or a CBG transmission information (CBGTI) field in order to explicitly indicate to the WTRU the CBGs being scheduled for retransmission.

Alternatively or additionally, the BS (e.g., gNB) may utilize a DCI format that reuses the existing fields, for example, MCS/NDI/RV or the like, with a single bit flag, such as the existing NDI field or a new flag altogether to indicate whether these existing fields apply to the initial TB transmission in which case they would have their original significance, or whether they apply to CBG-based retransmissions.

In one embodiment, the BS (e.g., gNB) may utilize the NDI and RV fields in order to inform the WTRU that the MCS field or an extended version of the MCS field conveys information regarding which CBGs are being retransmitted. The BS (e.g., gNB) may use the NDI in order to inform the WTRU that the scheduled transmission is a CBG-based retransmission of a previously transmitted TB, and retransmit the same RV as the original. The use of the NDI field or a flag may be taken as an implicit indication that the terminal may interpret the MCS field as indicating CBGIF (or CBGTI) of CBGs being retransmitted and also may assume that the retransmission is utilizing the same MCS as the original transmission.

In another embodiment, the BS (e.g., gNB) may utilize an extended DCI format designed specifically to schedule CBG-based retransmissions. This extended DCI format may contain the same original fields as those utilized by LTE, for example, MCS/RV/NDI or the like. In addition to the original fields, the extended DCI format may include an additional CBGIF (or CBGTI) in order to inform CBGs that are being retransmitted. With the CBGIF or CBGTI field, the BS (e.g., gNB) may have maximum flexibility in terms of adapting transmission parameters between the initial transmission and retransmission, since the BS (e.g., gNB) may utilize the MCS/RV fields for CBG-based retransmissions.

In yet another embodiment, the BS (e.g., gNB) may utilize a single common DCI format in order to schedule both initial TB transmissions and CB-based (re)transmissions. Such an approach may reduce the number of blind decoding attempts required at the WTRU. The DCI format utilized may contain the same original fields as those utilized by LTE (MCS/RV/HARQ process ID/PUCCH power control etc.), and an additional CBGIF or CBGTI. The CBGIF or CBGTI field may be used to indicate which CBGs are being retransmitted in the case of CBG retransmissions. Alternatively or additionally, an all '1' state or bits in the CBGIF or CBGTI may indicate transmission/retransmission of the entire TB. A compact assignment format may be utilized by the BS (e.g., gNB) in order to reduce the DCI payload size for this common DCI. For example, only supporting contiguous resource blocks (resource allocation type 2) may reduce DCI payload size at the cost of slightly reduced scheduling flexibility.

In another embodiment, the BS (e.g., gNB) may utilize a DCI format in order to schedule TB-based and/or CBG-based retransmissions, without CBGIF and explicit indication of which CBGs are being retransmitted for the CBG-based scheduling assignment. The two scheduling assignments may differ in terms of a flag, which may utilize an existing field such as the NDI or have an additional field that allows for differentiating between and initial TB-based transmission and a CBG-based retransmission. In such a case since the BS (e.g., gNB) has not indicated which CBGs are being retransmitted, the WTRU may implicitly assume that the BS (e.g., gNB) is retransmitting those CBGs that the WTRU indicated as NACK-ed when providing HARQ feedback. The scheduling assignment may keep the MCS/RV fields from the existing LTE DCI format, which might allow for maximum flexibility in terms of adapting the transmissions parameters, for example, MCS/RV or the like, as needed when going from TB-based transmission to CBG-based retransmission.

As described above, the number of HARQ bits may be selected so as to provide a trade-off between flexibility and feedback overhead. The BS (e.g., gNB) may configure a WTRU or group of WTRUs to utilize 'N' bits for multi-bit feedback, with each bit applying to a CB or CBG. For example, CBG-level multi-bit HARQ feedback may limit the feedback overhead while providing flexibility on granularity of retransmissions. In order to utilize an 'N' bit multi-bit HARQ feedback scheme where each bit applies to a CBG, where the 'N' is fixed irrespective of TBs, the number of CBs 'K' in a CBG may change according to TBs, with a larger TBs resulting in a larger 'K', whereas a smaller TBs would result in finer granularity of retransmissions since 'K' is smaller.

Alternatively or additionally, the BS (e.g., gNB) may semi-statically configure a group of WTRUs to utilize 'N' bits for multi-bit HARQ feedback based on the maximum transport block size (TBS) observed by the network, which the BS (e.g., gNB) may then semi-statically adapt. This may then be used to determine an appropriate CB to CBG grouping (e.g., 'K' CBs form a CBG, with 'K' fixed and determined on the basis of maximum observed TBS).

In yet another embodiment, a BS (e.g., gNB) may utilize a fixed 'K' CB to CBG grouping that is selected independent of TBS. This may result in a different number of CBGs for different TBs, and hence a different number of bits ('N') for the HARQ feedback scheme.

In another embodiment, a BS (e.g., gNB) may dynamically, via DCI, configure a WTRU with 'N' bits for multi-bit HARQ feedback. Both 'N' and 'K' defined above may be determined on the basis of the TBs of the initial or first transmission of a TB and may not be changed for all retransmissions of this TB.

In addition to employing a semi-static and/or dynamic configuration of HARQ feedback size, a WTRU may implicitly derive the number of CBGs (i.e. size 'N') for multi-bit HARQ feedback. This may be done on the basis of UCI payload size for configured PUCCH format(s) specified for a WTRU or group of WTRUs. For example, a WTRU configured with format similar to PUCCH format 3 in LTE may assume 10 bits for multi-bit HARQ feedback, whereas a WTRU configured with format similar to PUCCH format 1 b in LTE may implicitly assume 4 bits for multi-bit HARQ feedback.

A BS (e.g., gNB) may utilize semi-static and/or dynamic signaling to reconfigure a multi-bit HARQ feedback size for a WTRU. For example, the BS (e.g., gNB) may semi-statically configure a WTRU with parameter 'N', where 'N' is indicative of the total number of CBGs in the TB. With the parameter 'N', the BS may also inform the WTRU that an 'N' bit HARQ feedback (1 bit per CBG) is expected. In addition, the BS (e.g., gNB) may indicate dynamically a different value 'N$_1$' (where N$_1$<=N), thereby informing the WTRU a 'N$_1$' bit HARQ feedback should now be provided for any retransmissions. This value of 'N$_1$' may be based on those CBGs scheduled for retransmission as opposed to all CBGs in the TB.

Alternatively or additionally, instead of the number of CBGs used as an explicit indication of multi-bit HARQ feedback size, the WTRU may implicitly derive this information based on the scheduling DCI of the CBG retransmission. For example, if a WTRU receives a PDSCH that is scheduled by a PDCCH with fallback DCI, the WTRU may generate a HARQ feedback information bit only for the TB in the PDSCH. As an example, a WTRU configured with multiple PUCCH formats that are capable of carrying varying UCI payloads, may take this as an implicit indication.

Thus, the WTRU may utilize the PUCCH format with smaller payload size to provide HARQ feedback for CBGs retransmitted. The information regarding which CBGs are scheduled may be derived from the CBGIF (or CBGTI) of the scheduling DCI. This may result in reduced HARQ feedback (i.e. UCI size) when acknowledging multiple (CBG-based) retransmissions of the same TB, without impacting overall performance, as long as the reliability of this variable sized multi-bit HARQ feedback can be guaranteed.

Multi-bit HARQ feedback may be reconfigured between retransmissions. As described above, a larger number of HARQ feedback bits allows for greater flexibility in terms retransmission granularity and improved spectral efficiency, however the impact of multi-bit HARQ feedback on UCI should also be considered.

Limiting the number of HARQ feedback bits may be achieved by providing ACK/NACK feedback only for those CBGs explicitly scheduled for retransmission as opposed to providing feedback for all CBGs that form part of the initial TBs.

In one embodiment, a BS (e.g., gNB) may configure a WTRU or group of WTRUs to report HARQ feedback based on a fixed CBG assignment/scheduling set, for example, all CBGs in the TBs, irrespective of how many CBGs are being scheduled for retransmission by BS (e.g., gNB). This may simplify HARQ design since the number of HARQ feedback bits is fixed and equal to the total number of CBGs for the initial transmission of the TB and for all subsequent CBG-based retransmissions for this TB, resulting in no ambiguity in terms of which CBG a HARQ-ACK feedback bit may apply to. Under this scenario, the WTRU may follow some predefined rule for those CBGs not retransmitted by the BS (e.g., gNB). For example, the WTRU may report ACK for these CBGs since they were successfully received (or decoded) by the WTRU. If the WTRU generates HARQ ACK feedback in response to a retransmission of a TB corresponding to a same HARQ process as a previous transmission of the TB, the WTRU may generate an ACK for each CBG that the WTRU correctly decoded in a previous transmission of the TB.

In another embodiment, a BS may configure a WTRU or group of WTRUs to report HARQ feedback based on a maximum number of CBGs in TB(s), irrespective of how many CBGs are being scheduled for retransmission by the BS. If the WTRU is configured by the higher layer parameter that includes the maximum number of CBGs, the WTRU may need to use the maximum number of CBGs for generating respective HARQ feedback information bits for TB reception. For example, if a received TB includes 8 CBGs but the maximum number of CBGs configured by the higher layer parameter is 10, the WTRU may generate 10 HARQ information bits for multi-bit HARQ feedback. In this case, the first 8 bits may be determined by the result of decoding CBG (or TB), and the last 2 bits may be added or inserted based on dummy bits (e.g., ACK or NACK bits). In this example, the payload size of multi-bit HARQ feedback may be the same with the maximum number of CBGs.

In another example, a BS (e.g., gNB) may configure a WTRU or a group of WTRUs to adopt a variable-bit HARQ feedback scheme, which is based purely on the CBGs that are currently being scheduled for retransmission. This feedback scheme may significantly reduce HARQ feedback overhead, especially if pre-emption only affects a very small fraction of the total CBGs in the initial TB transmission and any subsequent retransmissions. The WTRU may append a small CRC (e.g., a single parity bit or 3 bit CRC) to the multi-bit HARQ feedback being reported to the BS (e.g., gNB). This may be beneficial to the variable-bit HARQ feedback method, since the number of feedback bits may vary between retransmissions and NACK to ACK error may result in difficulty in recovering previously transmitted CBGs.

Figure 8:
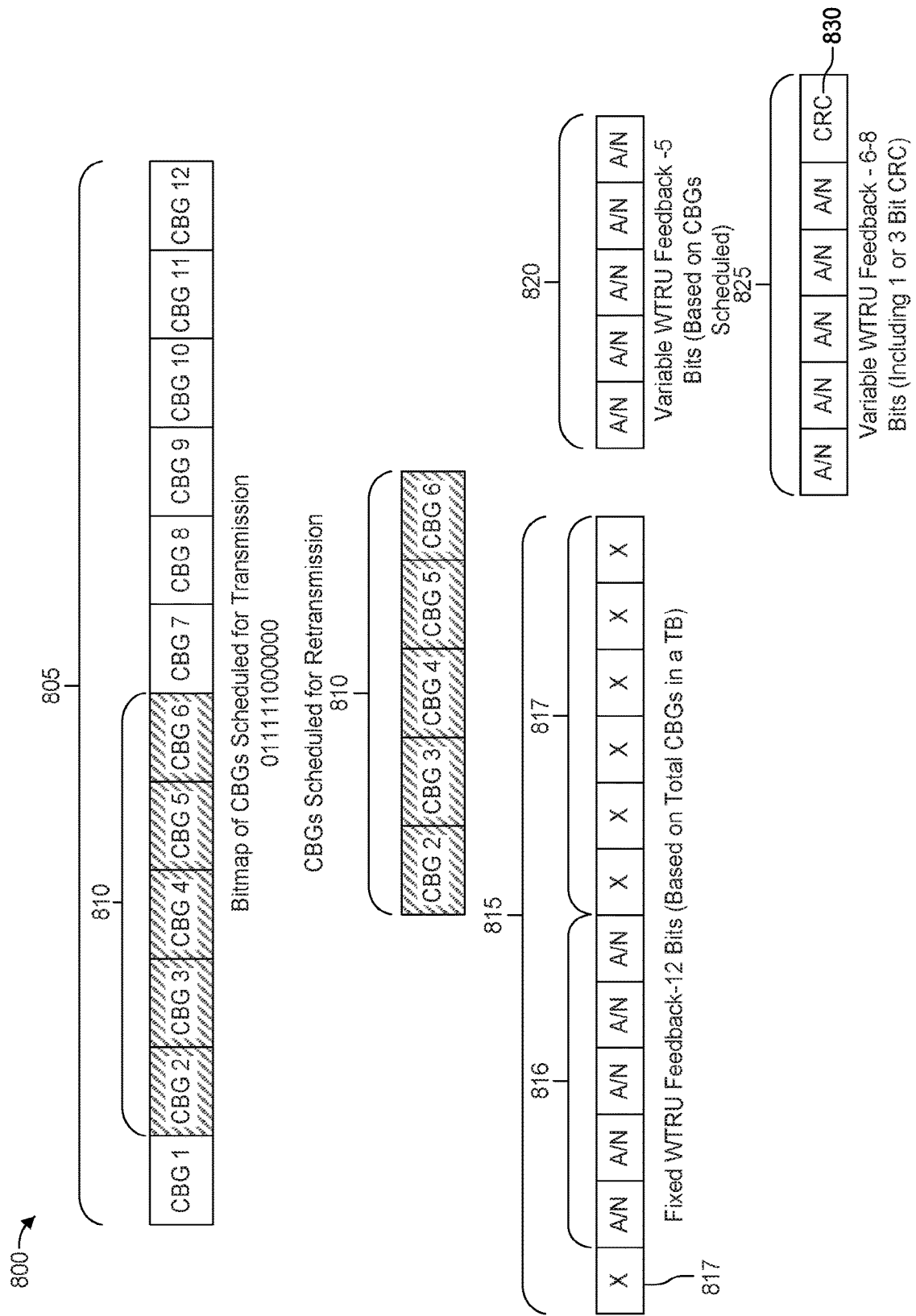
FIG. 8 is a diagram illustrating an example fixed-bit CBG-based HARQ feedback in contrast to an example variable-bit CBG-based HARQ feedback.

FIG. 8 illustrates an example reconfiguration of multi-bit HARQ feedback based on fixed-bit CBG-based HARQ feedback 815 or variable-bit CBG-based HARQ feedback 820, 825, which may be used in any combination of other embodiments described herein. As described above, multi-bit HARQ feedback may include one or more HARQ NACK information bits for the CBG(s) that a WTRU is requesting for transmission. After transmitting the multi-bit HARQ feedback, the WTRU may receive DCI over PDCCH for CBG(s) that are scheduled for retransmission. The DCI may include a bit map of CBGs 805 that are scheduled for transmission. As illustrated in FIG. 8, the bit map of CBGs 805 indicates that CBG 2, CBG 3, CBG 4, CBG 5, and CBG 6 810 are the CBGs that are scheduled for retransmission. Once the WTRU receives the retransmitted CBGs 810 (i.e. CBG 2, CBG 3, CBG 4, CBG 5, and CBG 6), the WTRU may reconfigure the multi-bit HARQ feedback based on fixed-bit CBG-based HARQ feedback 815 or variable-bit CBG-based HARQ feedback 820, 825.

If the WTRU is reconfigured to provide the fixed-bit CBG-based HARQ feedback 815, the WTRU may generate the multi-bit HARQ feedback (i.e. the fixed-bit CBG-based HARQ feedback 815) based on total number of CBGs in a TB. As shown in FIG. 8, the multi-bit HARQ feedback may include 12 bits for its fixed-bit CBG-based HARQ feedback 815. The WTRU may generate ACK or NACK bits 816 for the CBGs 810 that were retransmitted based on the result of decoding. For those CBGs that were successfully received (or decoded) in the previous transmission (i.e., CBG1, CBGs 7-12), the WTRU may generate ACK bits 817.

If the WTRU is reconfigured to provide the variable-bit CBG-based HARQ feedback 820, 825, the WTRU may generate the multi-bit HARQ feedback (i.e. the variable-bit CBG-based HARQ feedback 820, 825) based on the number of CBGs that are scheduled. As shown in FIG. 8, the multi-bit HARQ feedback may include 5 bits for its variable-bit CBG-based HARQ feedback 820. The WTRU may generate ACK or NACK bits 820 for the CBGs 810 that were retransmitted based on the result of decoding. In addition, the variable-bit CBG-based HARQ feedback 825 may include CRC 830 for error detection. For example, a single bit CRC 830 or 3 bit CRC 830 may be appended to the multi-bit HARQ feedback (i.e. the variable-bit CBG-based HARQ feedback 825) being reported to the BS. For example, if the number of CBGs being scheduled is small and/or the NACK to ACK error probability is low, the WTRU may choose to include just a single parity bit for error detection. Alternatively or additionally, if the number of CBGs being scheduled is large and/or there is a likelihood of encountering NACK to ACK errors, the WTRU may choose to utilize a longer, for example, 3 bit CRC. Upon receiving the HARQ feedback, the BS (e.g., gNB) may check the CRC. If the CRC check fails, the BS may ask the WTRU to resend the HARQ feedback. Alternatively or additionally, if the BS is able to detect which bit(s) are in error, the BS may choose to retransmit just the CBGs that correspond to the HARQ bit(s) in error.

Even though use of a parity bit or small CRC adds some additional bits of overhead to the HARQ feedback, such an approach may be used instead of utilizing a fixed 'N'-bit HARQ feedback scheme, where only a small number 'k' of CBGs (k<<N) are being scheduled for retransmission.

As described above, a BS (e.g., gNB) may semi-statically or dynamically configure a WTRU or group of WTRUs to utilize a fixed multi-bit HARQ or variable-bit HARQ feedback scheme. In one example, the BS (e.g., gNB) may configure WTRUs to report fixed multi-bit HARQ feedback using a PUCCH format that has a larger payload, similar to PUCCH format 4 or 5 in LTE. In another example, the BS (e.g., gNB) may configure WTRUs to report variable multi-bit feedback using a PUCCH format with a smaller payload, similar to PUCCH format 1 b or 3 in LTE.

Additionally, a WTRU or group of WTRUs may be semi-statically or dynamically switched between fixed and variable-bit HARQ feedback reporting schemes. This switching may be facilitated by factors such as the frequency of the URLLC traffic that is pre-empting eMBB traffic of a WTRU, the amount of time-frequency (T-F) resources being impacted by the pre-emption, or a change in observed interference, or the like.

In addition to semi-static and/or dynamic configuration of HARQ feedback size, a WTRU may implicitly derive the number of bits 'N' to utilize for multi-bit HARQ feedback. This may be done on the basis of configured PUCCH format(s) specified for a WTRU or group of WTRUs. As an example, a WTRU configured with a PUCCH format with a smaller payload size may use this as an implicit indication to utilize a variable-bit HARQ feedback format, wherein the WTRU may only provide HARQ feedback for those CBGs scheduled for retransmission by the BS (e.g., gNB). Alternatively or additionally, if a WTRU is configured with a PUCCH format with a larger payload size that may accommodate all 'N' bits of the full CBG set (set of all CBGs in the TB), the WTRU may in turn use this as an indication to provide HARQ feedback for all CBGs in the TB.

In an embodiment, a WTRU may be configured to utilize multiple PUCCH formats with varying UCI payload sizes, with the option to choose between these formats. For example, a coverage or power constrained WTRU may provide HARQ feedback only for those CBGs retransmitted by the BS (e.g., gNB) by choosing the smaller payload PUCCH format as opposed to all CBGs in the TB, as a means to reduce power consumption. The BS (e.g., gNB) may then need to blind decode the PUCCH in order to determine the PUCCH format and hence which type of feedback, for example, fixed or variable-bit, is being provided by the WTRU.

In another embodiment, a WTRU configured with an ability to utilize both fixed and variable-bit HARQ feedback, may start off using one option and then switch to the other based on various factors such as frequency of pre-empting traffic, CBGs impacted by the pre-emption, number of impacted WTRUs, interference or the like. For example, a WTRU may provide fixed-bit HARQ feedback for the entire CBG set (e.g., every CBG in the TB) for an initial retransmission. If, however, in the second transmission the number of CBGs being retransmitted is significantly lower, the WTRU may decide that it is more efficient to report variable-bit HARQ feedback just for those CBGs scheduled for the current retransmission.

A BS (e.g., gNB) may semi-statically configure a WTRU to use a particular feedback option as the default feedback mode. For example, a WTRU may be configured to utilize fixed-bit HARQ feedback based on the full CBG set, but may switch to a variable-bit feedback option if this is proving to be inefficient from a UCI overhead perspective. For example, if the BS (e.g., gNB) needs to schedule numerous retransmissions because only a small number of CBGs are in error, this would cause large uplink overhead since a large number of HARQ feedback bits need to be sent under a fixed-bit feedback scheme. The default feedback option may be configured to apply to several TB transmissions while the over-riding option may apply just to the current TB being transmitted.

In another embodiment, a WTRU may be configured to utilize a variable-bit HARQ feedback option as a default option, but may switch to fixed-bit HARQ feedback. For example, if several variable-bit feedback messages need to be retransmitted by the WTRU (due to failed CRC checks of these HARQ feedback messages resulting in retransmission requests of the HARQ feedback by the BS), this may result in additional HARQ overhead and/or data retransmissions. In such a case, it may be more efficient for the WTRU to revert to fixed bit HARQ feedback option.

In another embodiment, a WTRU may autonomously switch from a default feedback configuration to an alternative feedback option (e.g., from variable-bit HARQ feedback to fixed bit HARQ feedback.) This may be facilitated by configuring the WTRU with multiple PUCCH formats. Alternatively or additionally, switching or reconfiguring HARQ feedback options may be explicitly signaled via DCI or implicitly based on reconfiguration of PUCCH format or the like.

Multi-bit HARQ feedback for multiple PDSCHs is described herein. In the case of multi-carrier scheduling, a WTRU may need to provide aggregated HARQ feedback for multiple TBs. For example, multiple slots for DL transmission may need to be acknowledged by a single HARQ-ACK feedback slot. Even with PUCCH formats with larger payloads, the number of HARQ feedback bits available for transmission may be limited by the UCI payload size. The multiple PDSCHs may be considered as scheduled across multiple component carriers (CCs), multiple cells, multiple slots/mini-slots/sub-slots/non-slots, multiple bandwidth parts (BWPs), or the like. The methods disclosed herein may apply to any of the above scenarios of multiple PDSCHs that needs to be acknowledged by a single HARQ feedback message.

In an embodiment, the BS (e.g., gNB) may configure WTRUs semi-statically via RRC signaling and/or dynamically via L1/L2 layer signaling, to utilize a fixed HARQ-ACK feedback format in order to provide feedback for multiple TBs. The WTRU may then multiplex the HARQ-ACK feedback for multiple PDSCH TBs, sending ACK-NACK information for the entire CBG set, for example, all CBGs in a TB, across all TBs in a single HARQ-ACK feedback message. Multiplexing HARQ feedback for multiple TBs may mean that a WTRU or group of WTRUS acknowledges the reception of multiple TBs in the same multi-bit HARQ feedback. For example, if a WTRU receives two TBs, the WTRU may concatenate the HARQ-ACK information bits for the second TB after the HARQ-ACK information bits for the first TB. For example, if a WTRU received two TBs and each TB includes 8 CBGs, the multi-bit HARQ feedback may include 16 HARQ-ACK information bits for the two TBs. The first 8 bits may represent the HARQ-ACK information bits of CBGs in the first TB and the second 8 bits may represent the HARQ information bits of CBGs in the second TB. The WTRU may generate an ACK for the HARQ-ACK information bit of a CBG if the WTRU correctly received all CBs of the CBG. The WTRU may generate a NACK for the HARQ-ACK information bit of a CBG if the WTRU incorrectly received at least one CB of the CBG.

Alternatively or additionally, the BS (e.g., gNB) may configure a WTRU or group of WTRUs semi-statically and/or dynamically to utilize variable-bit HARQ-ACK feedback in order to reduce the total number of HARQ feedback bits needed to provide feedback for multiple TBs. The WTRU may then multiplex the HARQ-ACK feedback for multiple PDSCHs, sending an ACK or NACK only for those CBGs scheduled for retransmission across all TBs in a single HARQ-ACK feedback message.

In another embodiment, the BS (e.g., gNB) may configure a WTRU or group of WTRUs to utilize one or more PUCCH format types with varying payloads. The WTRU may then assume that it is an implicit indication to utilize a particular feedback format. For example, a WTRU configured with a PUCCH format capable of carrying only a small UCI payload may be taken as an indication that the BS (e.g., gNB) expects TB-based HARQ feedback only. The WTRU may then multiplex the ACK-NACK feedback for each TB and provide this as feedback to the BS (e.g., gNB).

In another embodiment, the BS (e.g., gNB) may configure a WTRU or group of WTRUs to utilize a single PUCCH format that is capable of carrying a large UCI payload This may be taken as an indication that the BS (e.g., gNB) expects CBG-based HARQ feedback or combined CBG and TB level feedback for each multiplexed PDSCH.

In yet another embodiment, a WTRU configured with multiple PUCCH resources/resource sets/formats may choose one or more resources among the PUCCH resources/resource sets/formats based on UCI payload. For example, if a WTRU needs to provide a multi-bit HARQ feedback response for several PDSCHs across multiple T-F resources (e.g., slots, cells, CCs, BWPs or the like), the WTRU may select the PUCCH resource set that is configured for the largest UCI payload size. However, if the WTRU needs to provide a multi-bit HARQ feedback for a few PDSCHs, the WTRU may be best served with selecting a PUCCH resource set that is configured for a slightly smaller UCI payload size. Additional details regarding PUCCH resource sets/formats and PUCCH resource selection is disclosed herein.

In another embodiment, a WTRU configured with multiple PUCCH format options may autonomously decide whether it is going to provide single-bit HARQ feedback or multi-bit HARQ feedback for a TB (e.g., by multiplexing CBG-based and/or TB-based feedback). For example, a WTRU may select the appropriate PUCCH format among the multiple PUCCH formats based on the size of HARQ feedback. The appropriate PUCCH format may be a format that can support large or small UCI payload capability. Based on the appropriate PUCCH format and size of HARQ feedback, the WTRU may determine the type of HARQ feedback to provide. In addition, the BS (e.g., gNB) may then ascertain which type of feedback was provided by blindly decoding the PUCCH.

Alternatively or additionally, instead of multiplexing multi-bit HARQ feedback across CBGs for all TBs that need to be being acknowledged, the BS (e.g., gNB) may provide the WTRU with the flexibility to multiplex CBG-based multi-bit HARQ feedback for a subset of all TBs and TB-based single-bit HARQ feedback for the remaining TBs. Specifically, the WTRU that is semi-statically and/or dynamically configured with higher layer parameter(s) may multiplex CBG-based multi-bit HARQ feedback for a subset of TBs, while providing TB-based single-bit HARQ feedback for the remaining TBs. For example, a WTRU that received 5 TBs via 5 component carriers (CCs) respectively may be configured to provide CBG-based multi-bit HARQ feedback for the first 3 CCs and TB-based single-bit HARQ feedback for the remaining 2 CCs. This means that the WTRU may provide multi-bit HARQ feedback for the first 3 TBs received via the first 3 CCs and single-bit HARQ feedback for the rest of TBs received via the remaining 2 CCs. These multi-bit HARQ feedback and single-bit HARQ feedback may be multiplexed (or concatenated) in a single feedback message. This technique may be referred to as dynamic codebook design. For example, a multiplexed feedback message may comprise multi-bit and single-bit HARQ feedbacks and may be generated based on a codebook comprising a first sub-codebook and a second sub-codebook. The first sub-codebook may be determined based on TB-based PDSCH receptions scheduled by fallback DCI. The second sub-codebook may be determined based on CBG-based PDSCH receptions scheduled by non-fallback DCI.

The CBG-based multi-bit HARQ feedback may be utilized for TBs that are affected by pre-emption, while those TBs that are not impacted by pre-emption or receive all CBGs successfully (i.e. receive the entire TB correctly) may be acknowledged by a TB-based single-bit HARQ feedback. The term CBG-based multi-bit HARQ feedback may be interchangeably used with multi-bit HARQ feedback, and the term TB-based single-bit HARQ feedback may be interchangeably used with multi-bit HARQ feedback.

The BS (e.g., gNB) may configure WTRUs with a feedback configuration (i.e. a PUCCH format) that allows the WTRU to provide this multiplexed CBG-based multi-bit HARQ feedback and TB-based single-bit HARQ feedback for several PDSCHs in a single HARQ feedback message. For example, if a WTRU transmit HARQ feedback using PUCCH format 2 or PUCCH format 3 or PUCCH format 4, the WTRU may be semi-statically and dynamically configured with higher layer parameters to provide this single HARQ feedback message. The higher layer parameter may include an indicator (e.g., CBG-DL=ON) indicating that the WTRU is semi-statically configured to provide HARQ feedback. The indicator (e.g., CBG-DL=OFF) may also indicate that the WTRU is dynamically configured to provide HARQ feedback. In an embodiment, although the WTRU is not configured with the higher layer parameter, the WTRU may provide the multiplexed CBG-based multi-bit and TB-based single-bit HARQ feedbacks. The configured feedback format may provide fields for both CBG-based multi-bit and TB-based single-bit HARQ feedback for each PDSCH. The WTRU may utilize the presence of the pre-emption indication transmitted by the BS (e.g., gNB) as an indication that these PDSCH transmissions may be better served by CBG-based multi-bit HARQ feedback, whereas those PDSCHs that failed to be decoded and weren't pre-empted (i.e. absence of pre-emption indication) may be better served by retransmission of the entire TB. The use of a single PUCCH format that supports both TB and CBG level feedback may simplify feedback design while providing a degree of flexibility, since it may provide the WTRU with the flexibility of choosing whether it should provide CBG and/or TB level feedback on a PDSCH by PDSCH basis, without the need for any additional UL signaling. The WTRU may also utilize presence of additional signaling such as pre-emption indication in aiding in its decision making.

The WTRU may indicate the subset of TBs via a field in the PUCCH field such as TB bitmap. Allowing the WTRU to have flexibility in determining how to acknowledge multiple TBs in a single HARQ-ACK feedback message may be beneficial, especially when the WTRU is power or coverage constrained. In this case, limiting the number of bits being transmitted per PUCCH may improve UL coverage, while having a negligible impact on downlink spectral efficiency.

In an embodiment, a WTRU may provide bundled HARQ feedback for all TBs or only a subset of TBs in a single feedback message. For example, a WTRU may multiplex a single bit ACK from each TB only across those TBs that have been received correctly by the WTRU or multiplex a single bit NACK from each TB that have been received in error.

Similar to the single PDSCH case, a WTRU or group of WTRUs may decide on the HARQ feedback format based on the configured PUCCH format. For example, a WTRU configured with a small (or the smallest) PUCCH payload format may take this as an implicit indication that the BS (e.g., gNB) expects to receive multiplexed TB-based single-bit HARQ feedback for all PDSCHs, whereas a WTRU configured with a large PUCCH payload format may take this an indication that the BS (e.g., gNB) expects to receive a single feedback message comprising both TB-based multi-bit and CBG-based single-bit multiplexed HARQ feedback for several PDSCHs.

In order to facilitate feedback options for multiple PDSCHs, various aspects of the HARQ codebook design may be considered. In one example, for the case of CBG-based multi-bit HARQ feedback, a semi-static codebook design may be employed for CBG-based multi-bit HARQ feedback wherein the size of the multi-bit HARQ feedback is fixed across all PDSCHs. This may be based on a configured number of CBGs such as the maximum number of CBGs across all PDSCHs. The semi-static codebook design may allow the WTRU to configure a fixed multi-bit feedback size across all PDSCHs, which is combined with providing feedback for all configured component carriers (i.e. all possible PDSCHs including scheduled and unscheduled PDSCHs). Thus, the semi-static codebook design may result in reduced complexity. However, overly large UCI payloads may be caused due to the number of configured CBGs and component carriers.

As described above, a WTRU semi-statically configured per serving cell with a higher layer parameter may receive PDSCHs that include CBGs of a TB. If the WTRU is semi-statically configured, the WTRU may be configured with a maximum number of CBGs by a higher layer parameter per serving cell to generate a semi-static codebook. This semi-static codebook may include respective HARQ-ACK information bits for a TB reception. Each of the HARQ-ACK information bits may correspond to all the CBGs (including the non-scheduled CBGs) in the TB. The payload size of the semi-static codebook may be the same as the configured number of CBGs (i.e. the maximum number of CBGs).

In another embodiment, a WTRU may utilize a dynamic HARQ codebook design to provide a HARQ feedback message where the size of the multi-bit HARQ feedback is fixed across all PDSCHs. For example, the size of the multi-bit HARQ feedback may be determined based on the maximum number of configured CBGs across all PDSCHs similar to the semi-static HARQ codebook design. However, in the dynamic HARQ codebook design, the WTRU may provide the HARQ feedback for the scheduled PDSCHs and not all configured PDSCHs. This may be facilitated by utilizing a downlink assignment index (DAI) type mechanism. Such an approach may lead to a reduction in HARQ feedback payload size. However, other factors such as difference in number of configured CBGs across scheduled PDSCHs may offset the savings.

Additional embodiments to efficiently utilize feedback resources and minimize wasted resources may be described herein. An example is to ensure the number of configured CBGs per TB across multiple TBs to be similar, thereby resulting in a minimal number of unnecessary feedback bits to be transmitted for the set of multiplexed PDSCHs. This may be done by configuring all TBs across multiple PDSCHs with the same number of CBGs, or within some delta value (e.g., 0 or 1). This may result in different granularity in terms of number of CBs that form a CBG across these TBs and may also result in a different granularity of (re)transmissions. However, this may be preferable to having a large feedback size per TB (or cell/CC), especially if different cells have different coverage. In addition, limiting the number of feedback bits for the coverage and power constrained WTRU (and overall feedback in general) may be more critical. Considering these factors, the BS (e.g., gNB) may configure the number of CBGs per TB while factoring what provides the best tradeoff in terms of HARQ feedback size (vs. granularity of CBG (re)transmission) for this coverage and power constrained WTRU.

Alternatively or additionally, a BS (e.g., gNB) may schedule PDSCHs in a manner that may reduce/optimize the number of feedback bits that need to be sent by a WTRU in order to acknowledge the scheduled PDSCHs. For example, the BS (e.g., gNB) may attempt to schedule PDSCHs that are within some 'δ' of configured CBGs in consecutive time slots. This may result in a significant reduction in the number of wasted or unnecessary HARQ bits. Scheduling similar sized PDSCHs in this manner may result in additional feedback savings in certain cases. For example, if none of the scheduled PDSCHs are pre-empted by low latency traffic, the WTRU may revert or fallback to multiplexing/bundling single-bit HARQ feedback for all PDSCHs. Especially, when the number of CBGs per PDSCH (for the scheduled PDSCHs) is small, such a scenario may result in a lower chance of low latency traffic impacting these transmissions since the transmission window may be smaller than, for example, when the number of configured CBGs per PDSCH is larger.

Scheduling PDSCHs based on the number of configured CBGs may lead to efficient feedback multiplexing in the case where the preempting low latency traffic is periodic in nature, as this may result in either all or none of the scheduled PDSCHs being impacted by low latency traffic. The first scenario may be the case where the low latency traffic is periodic and frequent. The second scenario may be the case where the preempting traffic is periodic and relatively infrequent. In either of these cases, the WTRU may need one type of feedback for example, multi-bit HARQ feedback for the first scenario, and single-bit HARQ feedback for the second scenario. This may allow the WTRU for efficient usage of feedback resources.

Alternatively or additionally, the BS (e.g., gNB) may schedule PDSCHs on the basis of the assigned component carriers (CCs). Scheduling PDSCHs based on the assigned CCs may be useful if this utilizes information on which resources are likely to be utilized in order to schedule low latency traffic. If certain CCs are designated or utilized for scheduling high priority low latency traffic, the BS (e.g., gNB) may consider either scheduling these CCs in successive slots or avoiding these CCs for consecutive slots. This may then result in more efficient multiplexing of feedback, since all PDSCHs may simply require multi-bit HARQ feedback (in the case where the scheduled CC transmissions are pre-empted) or single-bit HARQ feedback (in the case where none of the scheduled PDSCH transmission are impacted by pre-emption).

Alternatively or additionally, the coverage of the CC/serving cell may be the determining factor in selecting the appropriate HARQ feedback format for the scheduled PDSCHs. For example, if a WTRU is power constrained due to the coverage of several CCs, it may have to revert or fallback to multiplexing TB-based single-bit HARQ feedback for all scheduled PDSCHs in order to improve the UL coverage of the WTRU in these cells.

Alternatively or additionally, it may be necessary to provide some combination of TB-based single-bit and/or CBG-based multi-bit multiplexed HARQ feedback for the scheduled PDSCHs. This may be the case for the scenario where some of subsets of PDSCHs are impacted by pre-emption. In this case, those WTRUs impacted by the pre-emption may need to provide multi-bit HARQ feedback in order to provide feedback on individual CBGs. However, for the WTRUs that are not impacted by the pre-emption, single-bit feedback may be sufficient. In order to provide both TB-based and CBG-based feedback options, each individual feedback message may include fixed single-bit and multi-bit feedback fields. Being able to provide both TB-based and CBG-based feedback for scheduled PDSCHs may result in the optimal usage of transmission resources and possibly latency, because it can provide the BS (e.g., gNB) with full flexibility in determining the optimal granularity (CBG vs. TB) for retransmissions. Also, similar to the single PDSCH, utilizing both TB-based and CBG-based feedback may provide for built-in error detection (with added robustness) for HARQ feedback error as well. The downside of such an approach may be the case where the UCI payload is large.

The WTRU may utilize the absence or presence of pre-emption indication by the BS (e.g., gNB) in order to aid in its decision making as to whether to provide a CBG-based multi-bit and/or TB-based single-bit HARQ feedback for each scheduled PDSCH. For example, the WTRU may perceive the presence of this signal as an explicit indication that the BS (e.g., gNB) expects CBG-based multi-bit HARQ feedback for the impacted PDSCH. In another example, the WTRU may have autonomy regarding what type of feedback format to utilize. For example, if a large number of CBGs are unable to be successfully decoded in all scheduled PDSCHs and the WTRU is configured with two PUCCH formats to support either multiplexed TB-based single-bit HARQ feedbacks or multiplexed CBG-based multi-bit HARQ feedbacks, the WTRU may decide it is better off requesting retransmission of the entire TB for all PDSCHs Since the WTRU decide to request the retransmission of the entire TB for all PDSCHs, the WTRU may accordingly respond with single-bit HARQ feedback for all PDSCHs.

As describe above, various options for multiplexing HARQ feedbacks across scheduled PDSCHs may apply to both semi-static and dynamic codebook designs. As a result, TB-based single-bit HARQ feedback/CBG-based multi-bit HARQ feedback or the combination of both feedbacks for the set of multiplexed PDSCHs may be utilized for both semi-static and dynamic codebook designs.

For the case of dynamic HARQ-ACK feedback codebook design (based on scheduled cells/CC), the BS (e.g., gNB) may indicate this codebook size by using a counter downlink assignment indicator (DAI) and/or a total DAI in each DL assignment scheduled for PDSCH. The WTRU may then reliably determine the number of scheduled PDSCHs even if some DL assignments are lost. Since the number of configured CBGs per PDSCH is indicated to the WTRU, the WTRU may then use this information in conjunction with the CBGIF bitmap (or CBGTI bitmap) from the scheduling DCI for each PDSCH in order to determine the multi-bit HARQ feedback for this PDSCH. Utilizing a DAI type field lends itself to the scenario where each TB has the same multi-bit HARQ feedback size (which may be based on the maximum number of configured CBGs across all PDSCHs as described above).

Similar to the single PDSCH or non-multiplexed HARQ feedback case, a WTRU semi-statically configured for multi-bit HARQ feedback to provide multiplexed multi-bit HARQ feedback for several PDSCHs may need to revert to single-bit HARQ feedback for these PDSCHs when one or more of the PDSCHs being acknowledged in their respective HARQ feedback response was scheduled with a DCI that did not support CBG (re)transmission (e.g., when the PDSCH was scheduled via a fallback DCI).

As described above, for the semi-static codebook design, the codebook size may depend on the number of configured CCs, configured number of CBGs, the HARQ timing window, or the like. For example, a WTRU that is configured with 6 CBGs per a TB may need to provide a single HARQ feedback response for five TBs. The single HARQ feedback response may be generated by multiplexing each codebook for each TB into a single codebook for the entire TBs. In one example, all five TBs may be scheduled by DCIs that are capable of CBG-based (re)transmission, and the WTRU may simply respond with a 5*6=30-bit HARQ feedback response. However, in the case where one or more TBs are scheduled via a fallback DCI, the entire TB may be scheduled for TB-based retransmission. The WTRU may need to decide whether to respond with single-bit or multi-bit HARQ feedback. Having a mix of single-bit and multi-bit HARQ feedback for the various TBs may lead to possibility of misinterpretation of feedback.

In an embodiment, a WTRU may choose to keep the same feedback response (e.g., respond with multi-bit feedback for all TBs irrespective of whether or not they were scheduled via normal or fallback DCI). For those WTRUs that are configured to provide multi-bit HARQ feedback but scheduled via fallback DCI, the WTRU may simply repeat the single bit TB ACK or NACK N times in order to indicate whether the TB was correctly received or not. Here, N may be the number of CBGs in a TB or the entire TB. This may lead to a simplified design albeit at the cost of increased feedback overhead. For example, a WTRU that is semi-statically configured to provide multi-bit HARQ feedback receives two TBs where each TB has 8 CBGs. For the first TB, if all the CB-level CRC and TB-level CRC checks are passed, the WTRU may generate TB level ACK feedback by repeating an ACK information bit 8 times (i.e. 11111111). For the second TB, if all the CB-level CRC checks are passed but TB-level check is failed, the WTRU may generate TB level NACK feedback by repeating a NACK information bit 8 times (i.e. 00000000). Since the WTRU is semi-statically configured to provide multi-bit HARQ feedback, the results of two 8 bits (i.e. 11111111 for the first TB and 00000000 for the second TB) may need to be multiplexed. Thus, the WTRU may transmit a multi-bit HARQ feedback message that comprising first multi-bit HARQ feedback for the first TB and second multi-bit HARQ feedback for the second TB (i.e. 1111111100000000).

In another embodiment, a WTRU that has a single TB scheduled with a fallback DCI may take this as an indication that it needs to respond with single-bit HARQ feedback for all TBs in the CC/HARQ timing window. For example, if a WTRU receives 5 TBs scheduled with fallback DCI in 5 CCs respectively and each TB includes 6 CBGs, the WTRU may need to provide 30 bits (i.e. 6 bits*5 TBs) if the WTRU is configured to provide multi-bit HARQ feedback. However, if the WTRU can provide single-bit HARQ feedback for all TBs, the number of bits in the HARQ feedback may drop from 30 bits to just 5 bits. Although this may result in much lower UCI payload, the downside of such an approach may be a high number of possibly unnecessary retransmissions and wasted spectral efficiency.

In yet another embodiment, the choice of whether to respond with a single-bit vs. multi-bit HARQ feedback response for multiple aggregated PDSCHs may be based on decoding result for each PDSCH that needs to be acknowledged.

In another embodiment, if a single TB was scheduled via fallback DCI, but the WTRU determines that a significant number of the other PDSCHs were scheduled for CBG-based (re)transmission or a significant number of CBGs is impacted by pre-empting low latency traffic, the WTRU may decide to request retransmission of the entire TB for these PDSCHs. As a result, the WTRU may in turn respond with a single-bit HARQ feedback message for all PDSCHs. This determination may be based on some threshold. Such a threshold may include, but are not limited to, some number of PDSCHs, or a percentage (x %) of aggregated PDSCHs. Utilizing such a mechanism for switching between single-bit vs. multi-bit HARQ feedback for the aggregated PDSCHs may result in optimal usage of feedback resources (e.g., limiting UCI payload) while also minimizing the number of unnecessary retransmissions that may result.

If a WTRU is configured with multi-bit HARQ feedback and utilizes a feedback format that provides one or more fields in DCI indicating single-bit HARQ feedback and/or multi-bit HARQ feedback as a means of improving HARQ reliability, the WTRU may appropriately utilize these fields depending on whether fallback DCI or non-fallback DCI was utilized for scheduling the PDSCH. For example, for a PDSCH scheduled with the non-fallback DCI, the WTRU may utilize the multi-bit feedback field to provide HARQ feedback for each CBG. For a PDSCH scheduled with fallback DCI, the WTRU may use the single-bit feedback field (or none) to provide single-bit HARQ feedback based on the decoding result of the TB. On the other hand, for a PDSCH scheduled via a fallback DCI, the single-bit TB result would be relevant, and the WTRU may choose to repeat the single-bit feedback result for the multi-bit feedback field as well (i.e. ACK or NACK for all CBGs based on whether TB was or wasn't able to be decoded successfully). This means that in the case of fallback DCI, the single-bit field is more pertinent but the multi-bit field can also be used to provide TB-based multiple-bit HARQ feedback.

In the preceding embodiments, information regarding the number of configured PUCCH resource sets and their UCI payload capabilities may limit the ability of the WTRU to autonomously decide between single-bit or multi-bit HARQ feedback when providing a HARQ feedback response for the multiple aggregated PDSCHs. For example, if a WTRU is configured with only a single PUCCH resource set with a small UCI payload capability, the WTRU may take this an indication that it is expected to always respond with single-bit HARQ feedback for all aggregated PDSCHs. However, if a WTRU is configured with a PUCCH resource set with a large UCI payload capable of carrying a large UCI payload, the WTRU may take this as an explicit indication that it is expected to always respond with multi-bit HARQ feedback for each of the aggregated PDSCHs.

In yet another embodiment, a WTRU configured with more than one PUCCH resource set may take this as an implicit indication that it is up to the WTRU to select the appropriate feedback granularity. In this case, the BS (e.g., gNB) may need to blind decode the PUCCH in order to ascertain which PUCCH format was selected by the WTRU.

When a WTRU encounters a mix of fallback and non-fallback DCIs in the dynamic HARQ codebook case where the number of configured CBGs for all scheduled PDSCHs are the same, the WTRU may choose to utilize single-bit only and/or multi-bit HARQ feedback for these aggregated PDSCHs as described above.

The dynamic codebook design described above may consider HARQ feedback for scheduled cells/CCs as opposed to all configured cells. With CBG-based scheduling, there exists the possibility of an additional dimension to the dynamic aspect of the codebook design, which is a result of the CBG-based scheduling/transmission granularity. The size of multi-bit HARQ feedback may be based on the total number of CBGs (i.e., a configured number of CBGs) in the TB or CBGs scheduled for (re)transmission. Determining the size based on CBGs scheduled for (re)transmission may result in variable number of HARQ feedback bits between retransmissions of the same TB. In order to account for a variable number of bits between (and within) a PDSCH, the DAI functionality for the dynamic codebook design may be extended to account for all possible states. For example, with 4 configured CBG for a PDSCH, the number of HARQ feedback bits may vary between 1 and 4. In order to handle consecutive missing DL assignments, the DAI may need to 4 bits to support the possible 12 states. Depending on the number of configured CBGs, the DAI size and hence DCI message may grow substantially. Alternatively or additionally, different PDSCHs have different number of configured CBGs may make it difficult to efficiently design the DAI field size. In order to allow for variable-bit feedback, while attempting to limit the complexity and DCI overhead, various techniques to may be described herein.

In an embodiment, the network may consider limiting the number of CBGs configured per PDSCH, which in turn may limit the number of possible states that need to be covered by the DAI. Alternatively or additionally, two flavors of DCI may be used where each of them has a different DAI field size. This may be beneficial if the BS (e.g., gNB) considers multiplexing PDSCHs with similar number of configured CBGs whether it is large or small, allowing for selection between the two flavors. This may then limit the DCI size for those PDSCHs with smaller number of configured CBGs, also allowing for an efficient way of utilizing this field.

In another embodiment, the two flavors of DCI may be differentiated on the basis of variability of feedback length. For example, one flavor for the case where a fixed number of feedback bits per PDSCH are utilized (in which case the 2 bit DAI field from LTE may be used as is), and the other flavor for the case where a variable number of bits per PDSCH, which in turn may require a DCI with a larger DAI size. Whether a WTRU needs to monitor both DCI flavors may be configured by higher layer signaling and could be done at the same time when the BS (e.g., gNB) configures the number of CBGs per TB/PDSCH (since DAI size is directly dependent on the number of CBGs in the TB) on a per WTRU basis via RRC signaling.

In yet another embodiment, the two flavors of DCI may be based on DCI formats in LTE. For example, the extended DAI field may be reused by existing DCI format fields. For example, a 5 bit DAI field (capable of supporting 10 CBGs per TB) may be considered by combining the existing 2 bit DAI and 3 bit carrier indicator field (CIF). While this may result in loss of cross-carrier scheduling flexibility, this may in itself not be an issue, for example, when considering macro only deployments. This may significantly help reduce feedback overhead when considering HARQ multiplexing for multiple PDSCHs.

A WTRU may be configured by the BS (e.g., gNB) to utilize multiple PUCCH formats where each PUCCH format has a different payload (UCI) size. The WTRU may then consider when choosing its appropriate PUCCH format based on HARQ feedback requirements described above. Under such a scenario, the BS (e.g., gNB) may need to blind decode the PUCCH in order to ascertain which format and feedback option are being utilized by the codebook.

A BS (e.g., gNB) may either implicitly or explicitly indicate the time-frequency (T-F) region impacted by pre-emption to an affected WTRU or group of WTRUs. The system may designate that certain portion of the system bandwidth be utilized in order to accommodate low latency traffic. The designated region may cover the entire DL system bandwidth or may be limited to some portion of the total DL system bandwidth. The designated region may also be semi-statically assigned or change dynamically.

Figure 9:
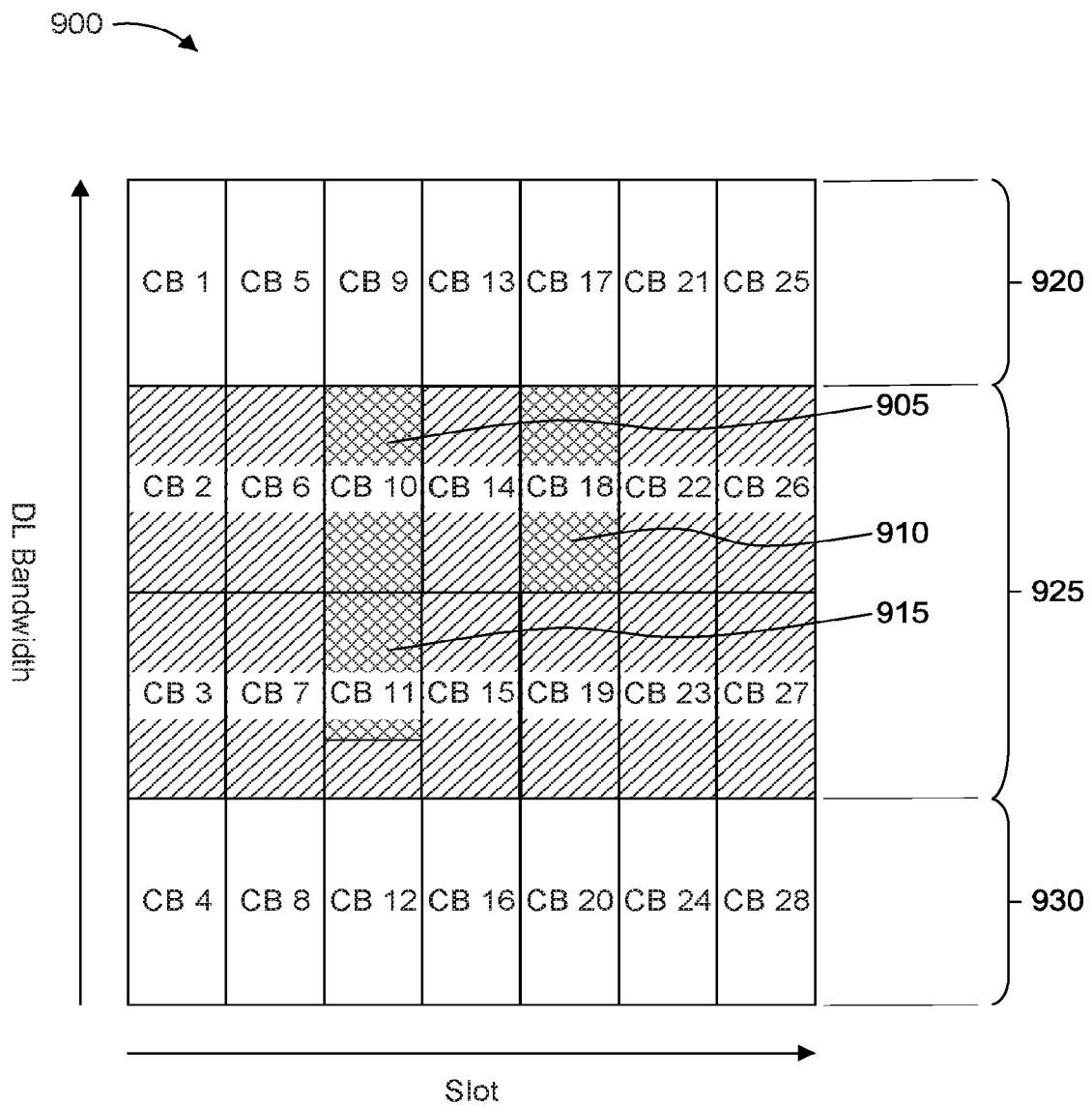
FIG. 9 is a diagram illustrating an example implicit pre-emption indication where a middle part of a downlink (DL) system bandwidth is designated as a pre-emptible region.

FIG. 9 illustrates an example implicit pre-emption indication 900 where a middle part of a DL system bandwidth is designated as a pre-emptible region 925. As an example, a BS (e.g., gNB) may semi-statically, via RRC signaling, indicate to a WTRU or group of WTRUs what portion of the total system bandwidth may be utilized by the BS (e.g., gNB) in order to accommodate the low latency traffic. This semi-static configuration may be viewed as an implicit pre-emption indication 900, wherein the BS (e.g., gNB) does not explicitly indicate to the WTRU the affected resources during pre-emption. This implicit pre-emption indication 900 may then be utilized by the WTRUs to help in decoding the affected CBs/CBGs/TB. For example, a WTRU that is configured with this information may first attempt to decode the PRBs in this designated region. If any of the CBs/CBGs in this region are in error, the WTRU may then send a multi-bit HARQ feedback indicating the indices of these CBs before even processing the remaining PRBs. This may be viewed as an early HARQ feedback mechanism based on implicit pre-emption indication 900. The early HARQ feedback may trigger early retransmissions, thereby improving latency. As illustrated in FIG. 9, the middle portion of system bandwidth may be designated as a predetermined pre-emptible region 925. The designated pre-emptible region 925 may include PRBs comprising CB2, CB3, CB6, CB7, CB14, CB15, CB18, CB19, CB22, CB23, CB26, and CB27. Among the CBs in the pre-emptible region 925, CB10 905, part of CB11 915, and CB18 910 may have been preempted to accommodate low latency traffic. The top region 920 and bottom region 930 may be scheduled for eMBB traffic CBs. For example, the top and bottom regions 920, 930 may include CB1, CB4, CB5, CB8, CB9, CB12, CB13, CB16, CB17, CB20, CB21, CB24, CB25, and CB28. The WTRU configured with this implicit pre-emption indication 900 may first attempt to decode CBs in the pre-emptible region 925. If the WTRU fails to decode any of the CBs in the pre-emptible region 925, the WTRU may then send a multi-bit HARQ feedback indicating the indices of these CBs before processing the remaining CBs.

A WTRU that possesses the capability to quickly/aggressively process the received CBG-based transmission/(re)-transmission may utilize such an early feedback mechanism.

Such a WTRU may be categorized as an aggressive/fast/ high capability WTRU and may aggressively/quickly process/decode symbols, mini-slots, sub-slots, non-slots, or the like within the transmitted slot. This may enable the WTRU to provide early HARQ feedback (i.e. an early HARQ-NACK based on early HARQ timing). Unlike the normal HARQ feedback timing which is based on slot based, the early HARQ-NACK feedback timing may be based on a symbol, mini-slot, sub-slot, non-slot timing, or the like. As a result, a WTRU capable of providing early HARQ feedback may request faster retransmissions, thereby reducing retransmission latency.

In an embodiment, a high capability WTRU/group of WTRUs that are semi-statically configured with a pre-emptible region may prioritize decoding of the resources within the pre-emptible region within the slot (e.g., a symbol, sub-slot, mini-slot, non-slot, or the like). For example, for each mini-slot, sub-slot, non-slot within the slot, the WTRU may identify CBGs that may have been potentially impacted by pre-empting low latency traffic. The WTRU may then determine the CBs within the CBG and proceed to decode the CBs that are the part of the CBGs potentially impacted by pre-emption. The WTRU may then determine the number of failed CBs within the CBG. If this number exceeds some threshold, the WTRU may deem the CBG un-decodable and hence failed. If one or more CBGs or some threshold of CBGs are deemed to have failed, the WTRU may initiate an early HARQ feedback, for example, based on mini-slot/non-slot/sub-slot timing. The early HARQ feedback may be single-bit or multi-bit HARQ feedback. In an example, a WTRU that is configured with CBG-based multi-bit HARQ feedback may utilize this on the mini-slot timing in order to request retransmission of the failed CBGs. For example, a WTRU that is configured with 8 CBGs per TB may include 8 bit multi-bit HARQ feedback The WTRU may utilize knowledge of the configured pre-emptible region to prioritize decoding of those resources within these symbols or mini-slots. If the number of CBGs that may be considered impacted and hence failed is considered to be significant, based on some number (e.g., at least one CBG) or a threshold (e.g., a percent or fraction of configured CBGs), the WTRU may utilize the multi-bit feedback to inform the BS (e.g., gNB) to retransmit these impacted (NACK-ed) CBGs.

In another embodiment, a WTRU that prioritizes decoding of the resources within the symbols or mini-slots for the configured pre-emptible region may utilize the early HARQ feedback to request (early) retransmission of the entire TB, as opposed to specific CBGs. This may occur in a scenario where a significant number of the CBGs are impacted by the pre-empting traffic. For example, if the early HARQ feedback is based on five of eight possible (or configured) CBGs and is the WTRU determined that four of these five CBGs are corrupted, the WTRU may send a multi-bit (8-bit) all NACK feedback requesting that the BS (e.g., gNB) retransmit the entire TB as opposed selected CBGs.

In yet another embodiment, a WTRU configured with multi-bit HARQ feedback may provide early HARQ feedback in the form of TB-based single-bit HARQ feedback. For example, a WTRU configured for CBG-based (re) transmission has a PDSCH scheduled by a DCI that does not support CBG-based (re)transmission but support a TB-based (re)transmission, the WTRU may provide early HARQ feedback in the form of TB-based single-bit HARQ feedback. For this, the BS (e.g., gNB) may utilize a fallback DCI that does not contain a CBG transmission indicator (CBGTI) field or CBG transmission information (CBGTI) field as examples. In such a case, even though the WTRU has been configured for CBG-based (re)transmission, the fallback DCI may act as an explicit indication that the WTRU respond with TB-based single-bit HARQ feedback. In such a scenario, if a single CBG has been impacted by the pre-empted traffic, the WTRU may again utilize knowledge of the configured pre-emptible region to prioritize decoding of resources within these symbols/mini-slots. In this case, if any (i.e. at least one) of the potentially impacted CBGs is unable to be decoded due to pre-empted traffic, the WTRU may provide TB-based single bit NACK early HARQ feedback on mini-slot timing, as opposed to having to wait for the normal HARQ timeline, resulting in a faster retransmission of the entire TB by the BS (e.g., gNB). As described above, a fallback DCI may not include a CBGTI field to indicate the support of TB-based single-bit HARQ feedback. A regular (non-fallback) DCI may include a CBGTI field to indicate the support of CBG-based multi-bit HARQ feedback.

As described above, a WTRU configured with multi-bit HARQ feedback may respond with TB-based single-bit HARQ feedback. In this scenario, if the WTRU notices that a significant number of early CBGs are impacted by the pre-empting traffic, the WTRU may have the autonomy to select the best (i.e. most appropriate) feedback format to request retransmission of the entire TB (as opposed to specific CBGs) via a TB-based single-bit early HARQ-NACK feedback message. With the flexibility to autonomously switch between single-bit and multi-bit HARQ feedback formats for both early HARQ feedback based on mini-slot HARQ timing and normal HARQ feedback based on normal (slot-based) HARQ timing, the WTRU may allow for optimal usage of PUCCH resources as the WTRU can switch between PUCCH resource sets/formats/resources. This may result in an even distribution of WTRUs over the various PUCCH resource sets/resources (as opposed to the case where all WTRUs configured for multi-bit HARQ feedback exclusively utilize mini-slot HARQ timing of the feedback or slot-based timing of the feedback only), thereby reducing the possibility of PUCCH collisions.

Alternatively or additionally, the window for early HARQ feedback for a WTRU may provide the WTRU with multiple opportunities to provide the early HARQ feedback. Each opportunity to provide HARQ feedback may be on one of several symbol/mini-slot/sub-slot/non-slot boundaries within the scheduled PDSCH transmission slot. Providing multiple early HARQ feedback opportunities may allow for optimal HARQ performance that results in reduced retransmission latency. The early HARQ NACK feedback opportunities may be utilized to provide cumulative HARQ-NACK feedback. They may indicate HARQ-NACK feedback for all CBGs from the start of the PDSCH transmission until the current/most recently decoded CBG result, thereby providing multiple possible HARQ-NACKs per CBG. Alternatively or additionally, the early HARQ feedback opportunities may be utilized to provide HARQ-NACK feedback for those CBGs between the last early HARQ feedback mini-slot boundary and the current HARQ feedback mini-slot boundary, implying a single HARQ-NACK feedback per CBG. The first (cumulative early feedback) option may be able to provide higher reliability at the cost of increased overhead. In an example, a WTRU configured with 8 CBGs per TB may have two early HARQ-NACK opportunities. The first opportunity may be based on the decoding result of the first two CBGs and the second opportunity may be based on the decoding result of the first five CBGs. If one of the first two CBGs is corrupted due to pre-emption, the WTRU may respond with a multi-bit (e.g., 8 bit) HARQ feedback message indicating NACK for the corrupted CBG at the second HARQ feedback mini-slot boundary. If the WTRU realizes that additional two CBGs (of three CBGs) are corrupted, between the first and second HARQ feedback mini-slot boundaries, the WTRU may then respond with another multi-bit HARQ feedback message indicating NACKs for the three corrupted CBGS of the five CBGs. This cumulative early feedback may improve the reliability for the first two CBGs, since effectively and cumulatively two HARQ feedback messages were provided for the corrupted CBGs. Thus, this may reduce the possibility of NACK-ACK errors which may result in increased retransmission latency, or ACK-NACK errors which may result in unnecessary retransmissions.

In addition, a WTRU that can transmit an early HARQ feedback report to the BS (e.g., gNB) may forgo transmission of the slot-based HARQ feedback report when this may deem to be unnecessary because the retransmission has already been requested. This may especially relevant to the case where the WTRU has had multiple opportunities to utilize early HARQ feedback and has in fact utilized these opportunities to request retransmission of certain CBGs and/or the entire TB. Forgoing the normal HARQ feedback response may be especially relevant if there is an overlap of the set of PUCCH resources (e.g., resource blocks) utilized to provide both early HARQ as well as normal slot-based HARQ feedback between multiple WTRUs. This may help reduce the possibility of unnecessary usage of PUCCH resources as well as possible collisions between different WTRUs.

In addition, if the WTRU knows that there is no need for normal HARQ feedback because early HARQ feedback is going to be utilized, it may reduce the possible restrictions in terms of PUCCH resources/PUCCH transmission durations and possibility of collisions between WTRUs as well as overall number of PUCCH resources that may be required to ensure reliable PUCCH performance.

Figure 10:
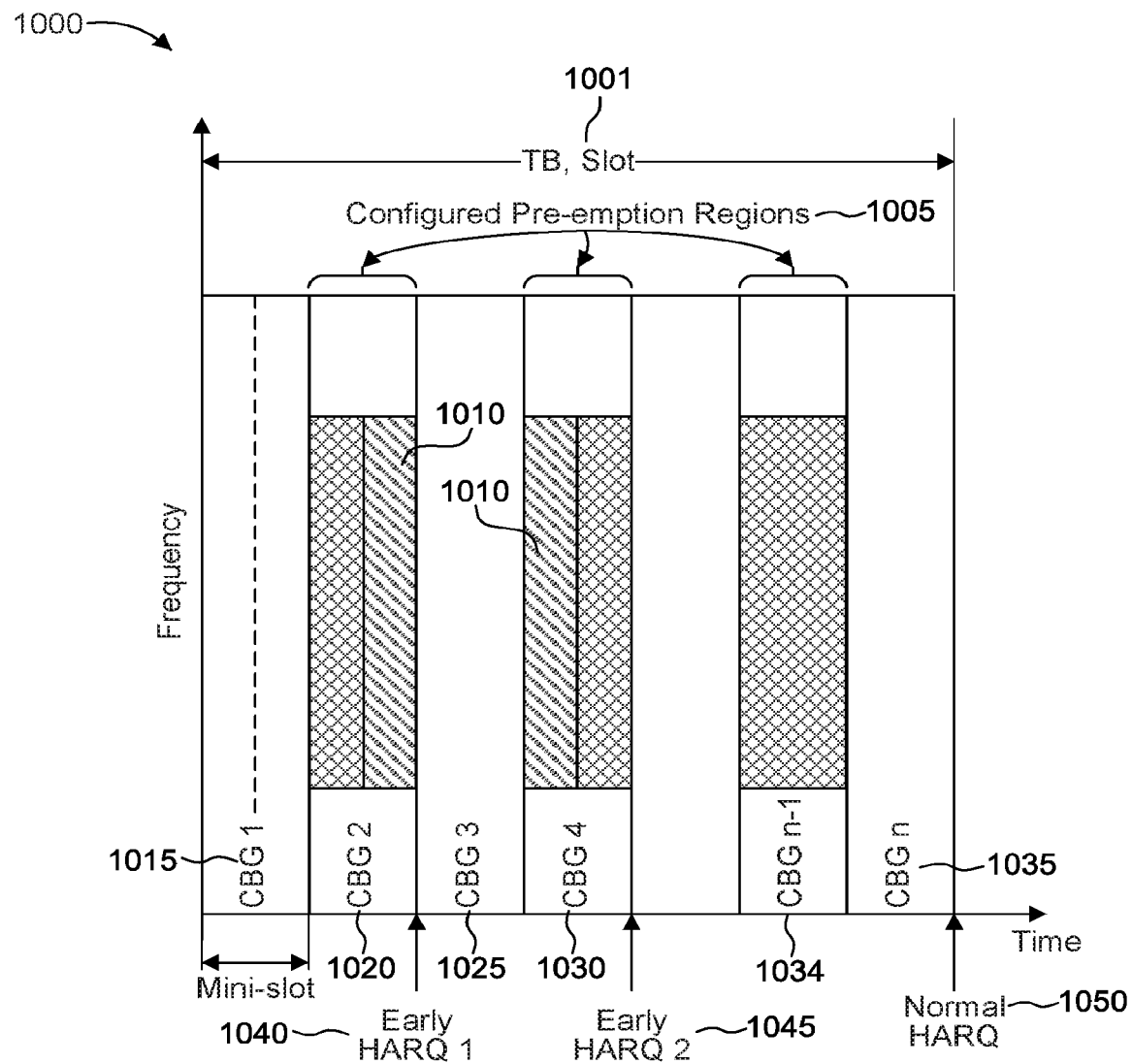
FIG. 10 is a diagram illustrating an example early HARQ feedback within a slot according to mini-slot timing.

FIG. 10 illustrates an example early HARQ feedback timing 1000 within a slot according to mini-slot timing, which may be used in any combination of other embodiments described herein. As illustrated in FIG. 10, a TB (or slot) 1001 may be configured with pre-emption regions 1005 that include CBG2 1020, CBG4 1030, and CBGn-1 1034 for low latency traffic. Among the CBGs in the pre-emption region 1001, some parts 1010 of CBG2 1020 and CBG4 1030 may be pre-empted to accommodate low latency traffic (i.e. pre-empted by low latency traffic). A WTRU has multiple (two in this case) early HARQ feedback opportunities (i.e. early HARQ1 1040 and early HARQ2 1045). For the first early HARQ opportunity (i.e. early HARQ1 1040), after the WTRU determines whether any of the first two CBGs (i.e. CBG1 1015 and CBG2 1020) have been impacted by the pre-empting low latency traffic, the WTRU may determine whether to transmit an early HARQ-NACK response at the early HARQ1 mini-slot timing 1040. For the second early HARQ opportunity (i.e. early HARQ 2 1045), after the WTRU determines whether any of the second two CBGs (i.e. CBG3 1025 and CBG4 1030) have been impacted by the pre-empting low latency traffic or whether any of the cumulative CBGs (i.e. CBG1 1015, CBG2 1020, CBG3 1025, and CBG4 1030) have been impacted by the preempting low latency traffic. The WTRU may then decide whether to provide an early HARQ-NACK response at early HARQ2 mini-slot timing 1045 only for CBGs 3 and 4 1025, 1030 or for CBGs 1 through 4 1015, 1020, 1025, 1030 (cumulative) as described above. If the WTRU chooses not to send an early HARQ feedback at any of the early HARQ1 mini-slot timing 1040 or early HARQ2 mini-slot timing 1045, the WTRU may transmit an normal HARQ feedback 1050 at normal HARQ timing 1050 for all the CBGs (i.e. CBG1 1015, CBG2 1020, CBG3 1025, CBG4 1030 . . . CBGn-1 1034, and CBGn 1035).

Figure 11:
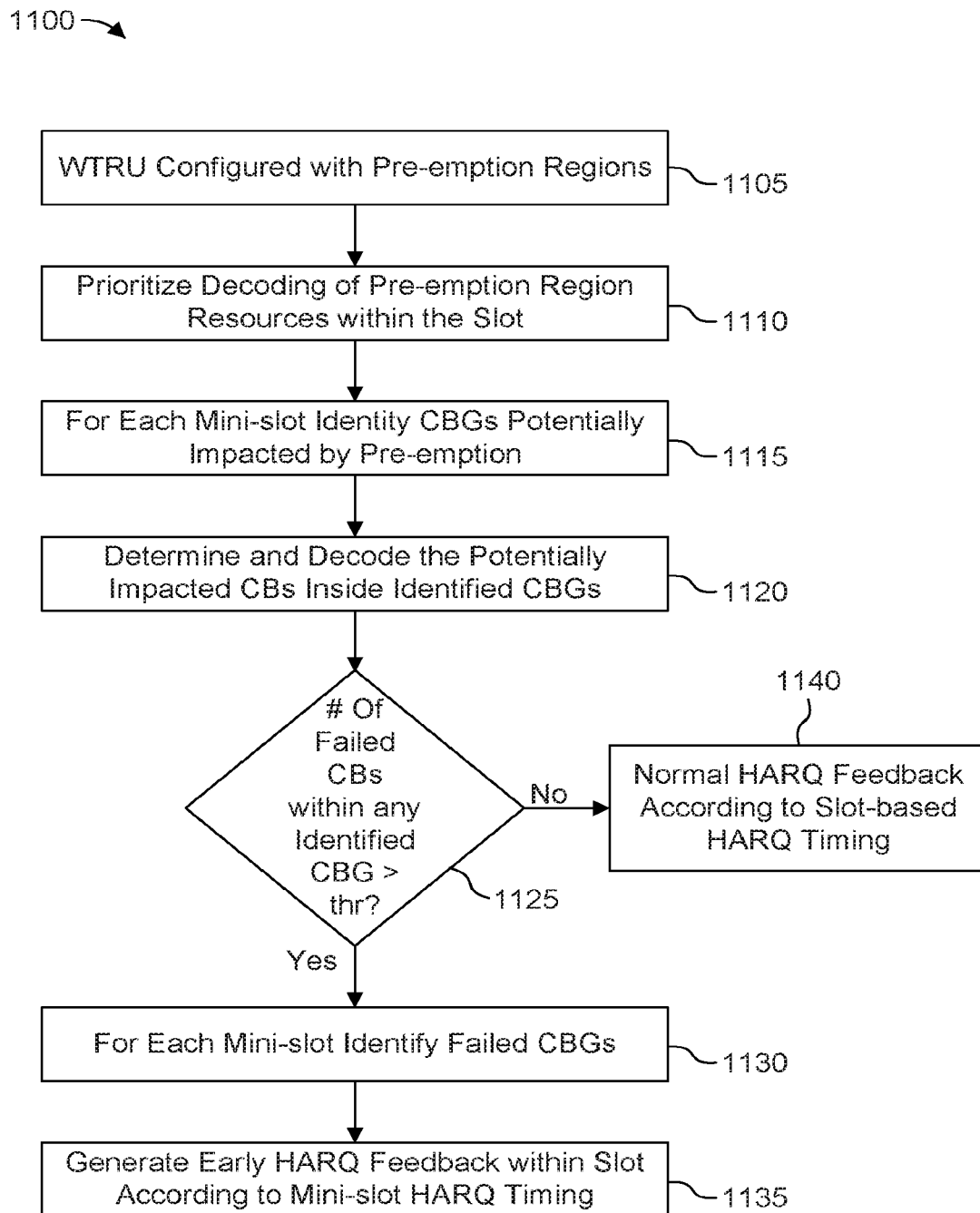
FIG. 11 a diagram illustrating an example procedure for determining early HARQ feedback within a slot according to mini-slot timing.

FIG. 11 illustrates an exemplary procedure 1100 for determining early HARQ feedback within a slot according to mini-slot timing, which may be used in any combination of other embodiments described herein. As illustrated in FIG. 11, a WTRU may determine whether or not to provide early HARQ NACK feedback based on prioritized decoding of pre-emption region resources within a slot. For example, at step 1105, the WTRU may be configured with pre-emption regions for low latency traffic as described above. At step 1110, the WTRU may prioritize decoding of resources in the pre-emption region within the slot. At step 1115, the WTRU may identify CBGs that are potentially impacted by low latency traffic for each mini-slot. At step 1120, the WTRU may attempt to decode the potentially impacted CBs in the identified CBGs. If the number of CBs in the identified CBGs is greater than a predetermined threshold at step 1125, the WTRU may further identify the CBGs that includes failed (or corrupted) CBs for each min-slot at step 1130. The WTRU may then generate early HARQ feedback within slot according to the mini-slot-based HARQ timing at step 1135. However, if the number of CBs in the identified CBGs is less than a predetermined threshold at step 1125, the WTRU may then generate normal HARQ feedback according to the slot-based HARQ timing at step 1140. The predetermined threshold may be received via a broadcasting message or RRC message from the BS. The predetermined threshold may also be preconfigured in the memory of the WTRU.

In an embodiment, an early HARQ feedback is used to reduce retransmission latency when eMBB data is pre-empted by low latency data. The early HARQ feedback may be transmitted according to a mini-slot HARQ timing when the WTRU fails to decode too may CBs of a CBG in a pre-emption region. For example, a WTRU may first prioritize decoding of CBs in one or more CBGs of a PDSCH transmission in configured pre-emption resources (i.e. pre-emptible CBGs), where a CBG may include a set of CBs. The WTRU may then determine one or more pre-emptible CBGs in a transmission of a PDSCH transport block (TB). For a pre-emptible CBG in the determined one or more pre-emptible CBGs, the WTRU may receive and attempt to decode one or more of the corresponding CBs. The WTRU may determine the number of CBs in the pre-emptible CBG for which the decoding is failed. The WTRU may transmit early HARQ feedback based on mini-slot HARQ timing when the number of failed CBs in the pre-emptible CBG exceeds a predetermined threshold. Alternatively or additionally, the WTRU may transmit regular HARQ feedback based on slot-based HARQ timing when the number of failed CBs in each of the pre-emptible CBGs in the slot is at or below the predetermined threshold.

In another embodiment, in addition to semi-statically configuring the WTRUs (e.g., via RRC signaling) with information regarding a designated pre-emption region, a BS (e.g., gNB) may explicitly, via dynamic signaling, indicate a location of the affected time/frequency resources. This may provide the WTRU the explicit location of the affected time or frequency resources so that the WTRU may utilize to help in decoding the affected CBs/CBGs/TB. For example, similar to the implicit indication case, the WTRU may first attempt to decode the CBs in the indicated/affected PRBs. The WTRU may then send the HARQ feedback based on the outcome of this decoding, allowing for early retransmissions. Although this explicit indication may have higher signaling overhead, the difference from the implicit indication case is that more precise information regarding the affected resources is provided.

A BS (e.g., gNB) may dynamically provide a WTRU or group of WTRUs additional timing and/or resource location information for the WTRU to send an early HARQ feedback message. This information may be provided as part of the pre-emption indication signaling. The WTRU may choose to send an early HARQ feedback message based on the location (in time and/or frequency) of the impacted resources. For example, the location of the pre-empted resources may occur early in the scheduled slot such as one of the first few symbols. The WTRU may have information regarding the location of frequency resources that are likely to be utilized in order to accommodate the low latency traffic. In such a scenario, the WTRU may provide early HARQ feedback based on the decoding result for the frequency resources in these symbols. Alternatively or additionally, the WTRU may decide against providing an early HARQ feedback message if the location of the pre-empted resources places undue constraints on WTRU processing times, for example, if the pre-emption affects a symbol/group of symbols at towards the end of the scheduling slot.

In another embodiment, a WTRU may be semi-statically pre-configured with a set of PUCCH resources that are specifically to be utilized for the purpose of providing early HARQ feedback. The set of PUCCH resources may include common resources to those resource sets preconfigured for normal (slot-based) HARQ feedback. Alternatively or additionally, these resources may be separate from other PUCCH resource sets that are utilized for normal HARQ feedback based on the normal slot based HARQ timing.

If the selected PUCCH format can include a moderate UCI (HARQ) payload and is transmitted over multiple/several symbols/min-slots/sub-slots (e.g., PUCCH over a long duration (PUCCH format 4) over a single resource-block pair), in order to efficiently exploit the PUCCH resource set, multiple WTRUs may share the same resource-block pair. The devices sharing the same resource-block pair within a symbol/mini-slot may be separated by different orthogonal phase rotations of a frequency domain sequence (e.g., cyclic shift in time domain). Alternatively or additionally, for a larger UCI payload format (e.g., greater than 2 bits) where multiple resource-block pairs are used (e.g., PUCCH formats 2 or 3), the multiplexing capacity for the symbols/mini-slots/non-slots may be increased by having multiple WTRUs share the same resource block pair with each WTRU using different orthogonal cover sequences, thereby reducing the number of PUCCH resources that may be needed for the early HARQ feedback.

Since the number of high capability WTRUs capable of aggressive HARQ processing may be a small fraction of total WTRUs served, these resources may be limited and possibly shared between WTRUs or groups of high capability WTRUs. The BS (e.g., gNB) may utilize HARQ feedback data that was received from the WTRU to determine what percentage of WTRUs are high capability WTRUs. The BS may also determine what fraction of these WTRUs is actually transmitting early HARQ-NACK feedback. The BS (e.g., gNB) may then utilize this data to semi-statically reconfigure the PUCCH resource sets in order to optimize resource usage.

Since the early HARQ feedback may be single-bit or multi-bit HARD feedback (as described above), the WTRU may be semi-statically pre-configured more than one PUCCH resource set/format in order to provide the BS (e.g., gNB) with early HARQ feedback. These PUCCH resource sets may be differentiated based on payload size as the normal slot based HARQ payload size.

In yet another embodiment, the WTRU may utilize the same PUCCH resources (resource blocks) that have been defined for the slot-based HARQ feedback.

In any of the above embodiment, the WTRU may need to account for the fact that the resources needed in order to provide early HARQ feedback resources may conflict with resources utilized in order to provide slot-based HARQ feedback in the time/frequency domains. For example, if the early HARQ utilizes resources (resource-blocks) over a certain set of symbols/mini-slots within the slot, these transmissions may overlap and therefore impact the slot-based HARQ feedback transmission window. Alternatively or additionally, the need to accommodate high capability WTRUs (i.e. capable of early HARQ feedback) as well as baseline capability WTRUs (i.e. capable of normal HARQ feedback only) may require sharing of PUCCH resources between various WTRUs in order to limit PUCCH usage. However this may increase a possibility of collisions between WTRUs.

A simple way to avoid the possibility of collisions is to forgo the normal HARQ transmission once an early HARQ feedback has been transmitted. As disclosed above, this may reduce any restrictions on early HARQ feedback with no loss in overall retransmission reliability, as well the possibility of collisions between different WTRUs PUCCH transmissions.

A WTRU may need to transmit both early HARQ feedback and normal HARQ feedback that are relevant to high reliability applications. To ensure that early HARQ (mini-slot timing based) feedback does not impact normal HARQ feedback, the WTRU may limit the early HARQ feedback to a short duration of PUCCH transmission, thereby ensuring that the early HARQ feedback transmission ends before the slot-based HARQ feedback transmission window. Utilizing a short duration of PUCCH transmission might be acceptable in that it may have no negative impact of HARQ feedback reliability because it may be assumed that at any given time, only a small percentage of total WTRUs in the system has limited power or limited coverage and most WTRUs do not require a long PUCCH duration transmission.

In another embodiment, the WTRU may be restricted in term of the number of available early HARQ feedback transmission opportunities within the slot. For example, in FIG. 10, instead of two early HARQ feedback transmission opportunities (early HARQ1 1040 and early HARQ 2 1045), the WTRU may be limited to a single early HARQ feedback opportunity (i.e. early HARQ 1 1040). This restriction may be based on whether a short or long PUCCH transmission is configured/utilized for HARQ feedback. For example, if the WTRU needs to utilize a long duration PUCCH transmission for the HARQ feedback, it may determine that early HARQ1 1040 provides the only opportunity for early HARQ feedback. On the other hand, if the WTRU needs to utilize short duration PUCCH transmission, it may be satisfactory to provide both HARQ feedback opportunities (i.e. early HARQ1 1040 and early HARQ2 1045) as neither may interfere with the normal (slot-based) HARQ transmission 1050.

In another embodiment, a WTRU may utilize transmit diversity that is similar to spatial orthogonal-resource transmit diversity (e.g., in LTE) by using different resources (in addition to time and frequency resources, making use of code domain as well) on different antennas. This may allow PUCCH transmissions from different antennas to basically appear as two PUCCH transmissions from two different WTRUs (at the cost of twice as many PUCCH resources). This means that instead of using the same PUCCH resource for early and normal HARQ feedback, the WTRU may utilize a code domain (e.g., different code on each antenna) in order to separate the two HARQ feedback transmissions. This may effectively allow for both early HARQ feedback and normal HARQ feedback transmissions.

In another embodiment, in the event that low latency traffic (e.g., URLLC) pre-empts eMBB WTRU resources, a BS (e.g., gNB) may, in addition to sending an explicit indication of the pre-empted resources, decide to automatically retransmit (or perform a subsequent transmission of) the affected CBs/CBGs even before it receives HARQ feedback from a WTRU. The presence of a subsequent transmission may be indicated to the WTRU or set of affected WTRUs via a 1-bit flag, and may be sent to the WTRUs along with the explicit indication signal.

The WTRU may then use this flag by not providing any HARQ feedback because the WTRU knows a follow-up transmission that the WTRU may use in order to decode the affected CBs if the initial transmission fails. Such a mechanism may have a dual benefit of reducing signaling overhead while improving latency, at the cost of use of additional transmission resources.

In another embodiment, it is possible that a WTRU has no information about whether resources originally scheduled have been pre-empted or not. This may be the case when: (i) there is no semi-statically configured information regarding a pre-defined pre-emptible region; (ii) the dynamic indication of pre-emption resources received via downlink control information (DCI) fails to arrive before ACK/NACK feedback; or (iii) there is no explicit indication of pre-empted resources to begin with. In such cases, the WTRU may monitor subsequent scheduling assignments (e.g., a following slot) to see if any CB/CBGs for a TB that was originally scheduled to be transmitted in a previous slot/mini-slot have now been scheduled as a subsequent transmission.

A BS (e.g., gNB) may transmit a pre-emption indication in order to inform a WTRU of the resources and hence CBs/CBGs that are impacted by pre-empting low-latency traffic. This pre-emption indication and resulting retransmission may help the WTRU when it determines how to handle the affected CBGs and decode the TB.

In an embodiment, the WTRU may decide to flush the soft buffer contents related to all affected CBGs or a subset of affected CBGs and utilize the retransmission of these affected CBGs for decoding. This approach of flushing out all related contents of a CBG may be particularly beneficial if a significant number of CBs in the affected CBGs have been corrupted due to pre-emption. In this case, it may be best to utilize HARQ combining across future retransmissions as opposed to the highly unreliable initial transmission.

In another embodiment, a WTRU may decide to flush the soft buffer contents related to a subset of CBs within the affected set of CBGs as opposed to the entire CBG. Under such a scenario, the WTRU may utilize chase combining if the retransmission is based on the same incremental redundancy (IR) as the initial transmission or incremental redundancy HARQ if a different redundancy versions (RV) is utilized for the retransmission for those CBs in the soft buffer that were not flushed, as a means to improve decoding success. The WTRU may utilize the CB level CRC check as a method to decide which CBs within a CBG need to be flushed. This approach may be particularly useful if a small number of CBs in a CBG have been corrupted due to pre-emption.

The timing of CBG-based transmission may impact on the HARQ feedback of a WTRU. The BS (e.g., gNB) may schedule a CBG-based retransmission for a TB that has been impacted by pre-empted low latency traffic. This BS (e.g., gNB) may initiate this retransmission proactively (i.e., prior to reception of HARQ feedback from the WTRU) or based on resulting HARQ ACK-NACK feedback provided by the WTRU.

In an embodiment, the BS (e.g., gNB) may decide to retransmit the CBGs impacted by pre-emption proactively, for example, without waiting for a resulting HARQ response from the WTRU. This may be done on the basis of some estimated probability of decoding failure based on the number of impacted resources and hence the number of impacted CBGs or the like. In the case of proactive or subsequent transmission, the BS (e.g., gNB) may indicate to the WTRU timing and resources for HARQ feedback that the WTRU needs to utilize.

Under such a scenario, the WTRU may decide to respond with two separate HARQ feedback messages. The first HARQ message may be based on the original PDSCH (TB) transmission timing, and the second HARQ message may be based on the new/updated resource/timing information provided with the subsequent transmission. The WTRU may employ HARQ combining of the initial transmission with the subsequent transmission for the second HARQ message. Alternatively or additionally, the two HARQ messages may differ in terms of granularity of feedback format (e.g., multi-bit vs. single bit) or the like. In an example, if the result of the initial transmission with pre-emption results in several CBGs being decoded incorrectly, the WTRU may provide CBG-based multi-bit HARQ feedback in order to notify the BS (e.g., gNB) of which CBGs need to be retransmitted. If HARQ combining the initial transmission with the subsequent transmission still results in a several CBGs in error or results in the entire TB to be decoded successfully, the WTRU may decide to provide a single-bit HARQ feedback message for either of these cases. This may be taken as an implicit indication that the BS (e.g., gNB) should retransmit the entire TB in the next retransmission.

Alternatively or additionally, if both an initial transmission and a subsequent transmission result in a small number of CBGs being in error, from a frequency spectrum efficiency perspective, it may be more efficient to provide the BS (e.g., gNB) with CBG-based HARQ feedback so that the BS (e.g., gNB) may retransmit those CBGs requested by the WTRU as opposed to single-bit feedback which would result in the entire TB being retransmitted.

The WTRUs' flexibility to select the best feedback option for each message may help reduce UCI overhead while providing a best performance in terms of spectral efficiency. Alternatively or additionally, the use of two HARQ feedback messages may also result in improved robustness of ACK-NACK messages.

Switching between HARQ feedback options may be facilitated by configuring the WTRU with different PUCCH formats. The BS (e.g., gNB) may then blind decode the PUCCH in order to ascertain the granularity of the feedback message. In an embodiment, a WTRU may be configured to respond with a single HARQ feedback response when a subsequent transmission procedure by the BS (e.g., gNB) is based on the result of HARQ combining the two transmissions. This may be configured either explicitly or implicitly.

For example, the indication of a subsequent transmission by the BS (e.g., gNB) may be taken as a signal to send a single HARQ response. The WTRU may then send a single HARQ response based on the result of HARQ combining the two transmissions. The timing of the response may be based on the newly indicated timing/resources in order to provide the WTRU with adequate processing time. Alternatively or additionally, the WTRU may autonomously decide the format (e.g., single-bit vs. multi-bit) for this single HARQ feedback response. For example, if only a small number of CBGs are in error, it may be better to respond with CBG-based multi-bit HARQ feedback. However, if a significant number of CBGs remains in error, the WTRU may respond with a single-bit NACK, indicating that the BS (e.g., gNB) needs to retransmit the entire TB. Responding with a single HARQ feedback message may also lead to savings in feedback overhead. For example, where the subsequent transmission(s) results in any previously corrupted CBG(s) being successfully received, the WTRUs waiting to send a single HARQ message may transmit a single-bit ACK signifying that the entire TB has now been received. In contrast, relying on HARQ based retransmission or subsequent transmission with two HARQ feedback messages may result in at least one multi-bit HARQ message followed by another multi-bit or single bit HARQ message. The above mentioned procedures may be extended to the case where the BS (e.g., gNB) schedules multiple subsequent transmission(s) after pre-emption. Alternatively or additionally, if the BS (e.g., gNB) scheduled CBG retransmissions based on HARQ feedback provided by the WTRU, the WTRU may simply follow the timing associated with the original TB transmission.

Alternatively or additionally, the HARQ processing capability of the WTRU may impact HARQ processing and feedback response time. In an example, if a high capability WTRU receives an original transmission followed by a subsequent transmission, the WTRU may utilize (mini-slot timing based) early HARQ feedback and/or (slot-based) normal HARQ feedback for the original transmission The WTRU may then perform the same for the subsequent transmission (after HARQ combining with the original transmission). This may be utilized as a method for improving HARQ reliability.

In another embodiment, a WTRU may only respond with a slot-based HARQ response for the initial transmission followed by a combination of (mini-slot based) early HARQ feedback and/or (slot-based) normal HARQ feedback for the subsequent transmission after HARQ combining with the original transmission.

In yet another embodiment, the WTRU may forgo sending a HARQ response for the initial transmission and wait for the subsequent transmission before sending a HARQ feedback response. The resulting HARQ feedback response may be based on HARQ combining of the initial transmission with the subsequent transmission and may involve early HARQ feedback and/or normal HARQ feedback.

The early HARQ feedback generated during the transmission of the subsequent transmissions in the above examples may be based on the HARQ combining result of the initial transmission (which has already been received) with the CBGs received in the initial symbols/mini-slots of the subsequent transmission. In FIG. 10, considering two consecutive (TB/slot 1001) transmissions (the second transmission of TB/slot is not shown in FIG. 10), the early HARQ mini-slot timing opportunities may occur within the symbols/mini-slots/non-slots of the second slot (subsequent transmission). For this case, the WTRU may utilize pre-emption indication (via group common PDCCH) and CBG flushing out indication (CBGFI) information in determining whether a subsequent transmission may be scheduled by the BS (e.g., gNB). This may justify skipping the HARQ feedback response based on the initial transmission instead of waiting to receive this subsequent transmission before responding with a HARQ response.

The granularity (e.g., single-bit vs multi-bit) and format of the early and/or normal HARQ feedback responses to the initial and/or subsequent transmissions may follow the procedures described above.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a wireless transmit/receive unit (WTRU), the method comprising:
receiving configuration information indicating a configuration for the WTRU to utilize multi-bit hybrid automatic repeat request (HARQ) feedback, wherein the multi-bit HARQ feedback is configured for the WTRU to provide feedback per code block group (CBG) of a given transport block (TB), and the configuration information indicating a maximum number of CBGs for CBG-based HARQ feedback;
receiving information that indicates a physical downlink shared channel transmission for the WTRU, the physical downlink shared channel transmission comprising a first TB, the first TB comprising a first plurality of CBGs;
receiving the physical downlink shared channel transmission;
determining that at least a first CBG of the first plurality of CBGs comprised in the physical downlink shared channel transmission was successfully received;
receiving a dynamic pre-emption indication, wherein the dynamic pre-emption indication indicates one or more sets of time-frequency resources corresponding to the physical downlink shared channel transmission were pre-empted by another transmission, the one or more sets of time-frequency resources corresponding to at least a second CBG of the first plurality of CBGs in the first TB;
receiving a retransmission that comprises the second CBG of the first plurality of CBGs, wherein the first CBG is not comprised in the retransmission;
determining that at least the second CBG was successfully received; and
transmitting HARQ feedback in response to the retransmission, wherein the HARQ feedback transmitted in response to the retransmission comprises a first HARQ acknowledgment (HARQ-ACK) bit for the first CBG that was not comprised in the retransmission and a second HARQ-ACK bit for the second CBG that was comprised in the retransmission.

2. The method of claim 1, further comprising attempting to decode each of the CBGs comprised in the first plurality of CBGs from the physical downlink shared channel transmission, and transmitting HARQ feedback in response to the physical downlink shared channel transmission, wherein the HARQ feedback transmitted in response to the physical downlink shared channel transmission comprises a respective HARQ feedback bit for each CBG in the first plurality of CBGs in the first TB.

3. The method of claim 2, wherein negative acknowledgements are indicated in a bit corresponding to the second CBG associated with the time-frequency resources indicated as pre-empted by the dynamic pre-emption indication.

4. The method of claim 1, wherein a number of bits to be included in a multi-bit HARQ feedback transmission corresponds to the maximum number of CBGs for CBG-based HARQ feedback.

5. The method of claim 4, wherein each bit of the number of bits is associated with a plurality of code blocks.

6. The method of claim 1, wherein the dynamic pre-emption indication is received in downlink control information (DCI).

7. The method of claim 1, wherein the configuration information is received in a radio resource control (RRC) message.

8. The method of claim 1, further comprising receiving a semi-static configuration indicating a plurality of time-frequency regions that could be pre-empted, wherein the dynamic pre-emption indication explicitly indicates which of the plurality of time-frequency regions has been pre-empted.

9. The method of claim 1, wherein the dynamic pre-emption indication is transmitted to a plurality of WTRUs.

10. The method of claim 1, further comprising receiving a further retransmission that comprises at least one CBG of the first plurality of CBGs associated with the one or more sets of time-frequency resources that were indicated as pre-empted by the dynamic pre-emption indication.

11. A wireless transmit/receive unit (WTRU) comprising:
a transceiver; and
a processor configured to:
receive configuration information indicating a configuration for the WTRU to utilize multi-bit hybrid automatic repeat request (HARQ) feedback, wherein the multi-bit HARQ feedback is configured for the WTRU to provide feedback per code block group (CBG) of a given transport block (TB), and the configuration information indicating a maximum number of CBGs for CBG-based HARQ feedback;
receive information that indicates a physical downlink shared channel transmission for the WTRU, the physical downlink shared channel transmission comprising a first TB, the first TB comprising a first plurality of CBGs;
receive the physical downlink shared channel transmission;
determine that at least a first CBG of the first plurality of CBGs comprised in the physical downlink shared channel transmission was successfully received;
receive a dynamic pre-emption indication, wherein the dynamic pre-emption indication indicates one or more sets of time-frequency resources corresponding to the downlink shared channel transmission were pre-empted by another transmission, the one or more sets of time-frequency resources corresponding to at least a second CBG of the first plurality of CBGs in the first TB;
receive a retransmission that comprises the second CBG of the first plurality of CBGs, wherein the first CBG is not comprised in the retransmission;
determine that at least the second CBG was successfully received; and
transmit HARQ feedback in response to the retransmission, wherein the HARQ feedback transmitted in response to the retransmission comprises a first HARQ acknowledgment (HARQ-ACK) bit for the first CBG that was not comprised in the retransmission and a second HARQ-ACK bit for the second CBG that was comprised in the retransmission.

12. The WTRU of claim 11, wherein the processor is further configured to attempt to decode each of the CBGs comprised in the first plurality of CBGs from the physical downlink shared channel transmission, and the transceiver is further configured to transmit HARQ feedback in response to the physical downlink shared channel transmission, wherein the HARQ feedback transmitted in response to the physical downlink shared channel transmission comprises a respective HARQ feedback bit for each CBG in the first plurality of CBGs in the first TB.

13. The WTRU of claim 12, wherein negative acknowledgements are indicated in a bit corresponding to the second CBG associated with the time-frequency resources indicated as pre-empted by the dynamic pre-emption indication.

14. The WTRU of claim 11, wherein a number of bits to be included in a multi-bit HARQ feedback transmission corresponds to the maximum number of CBGs for CBG-based HARQ feedback.

15. The WTRU of claim 14, wherein each bit of the number of bits is associated with a plurality of code blocks.

16. The WTRU of claim 11, wherein the dynamic pre-emption indication is received in downlink control information (DCI).

17. The WTRU of claim 11, wherein the configuration information is received in a radio resource control (RRC) message.

18. The WTRU of claim 11, wherein the processor is further configured to receive a semi-static configuration indicating a plurality of time-frequency regions that could be pre-empted, and wherein the dynamic pre-emption indication explicitly indicates which of the plurality of time-frequency regions has been pre-empted.

19. The WTRU of claim 11, wherein the processor is further configured to receive a further retransmission that comprises at least one CBG of the first plurality of CBGs associated with the one or more sets of time-frequency resources that were indicated as pre-empted by the dynamic pre-emption indication.

20. A base station comprising a transceiver and a processor, the processor configured to:
send configuration information indicating a configuration for a wireless transmit receive unit (WTRU) to utilize multi-bit hybrid automatic repeat request (HARQ) feedback, wherein the multi-bit HARQ feedback is configured for the WTRU to provide feedback per code block group (CBG) of a given transport block (TB), and the configuration information indicating a maximum number of CBGs for CBG-based HARQ feedback;
send information that indicates a physical downlink shared channel transmission for the WTRU, the physical downlink shared channel transmission comprising a first TB, the first TB comprising a first plurality of CBGs;
send the physical downlink shared channel transmission;
send a dynamic pre-emption indication, wherein the dynamic pre-emption indication indicates one or more sets of time-frequency resources corresponding to the physical downlink shared channel transmission were pre-empted by another transmission, the one or more sets of time-frequency resources corresponding to at least a second CBG of the first plurality of CBGs in the first TB;
send a retransmission that comprises the second CBG of the first plurality of CBGs, wherein the first CBG is not comprised in the retransmission; and
receive HARQ feedback in response to the retransmission, wherein the HARQ feedback received in response to the retransmission comprises a first HARQ acknowledgment (HARQ-ACK) bit for the first CBG that was not comprised in the retransmission and a second HARQ-ACK bit for the second CBG that was comprised in the retransmission.

* * * * *